United States Patent
Wu et al.

(10) Patent No.: US 10,142,226 B1
(45) Date of Patent: Nov. 27, 2018

(54) DIRECT NETWORK CONNECTIVITY WITH SCALABLE FORWARDING AND ROUTING FLEETS

(71) Applicant: Amazon Technologies, Inc., Seattle, WA (US)

(72) Inventors: Yiwen Wu, Fairfax, VA (US); Bashuman Deb, Aldie, VA (US); Russell Richard Leighton, Cabin John, MD (US); Mark Edward Stalzer, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/604,596

(22) Filed: May 24, 2017

(51) Int. Cl.
*H04L 12/713* (2013.01)
*H04L 12/46* (2006.01)
*H04L 29/08* (2006.01)
*H04L 12/741* (2013.01)

(52) U.S. Cl.
CPC ........ *H04L 45/586* (2013.01); *H04L 12/4633* (2013.01); *H04L 12/4641* (2013.01); *H04L 45/74* (2013.01); *H04L 67/141* (2013.01); *H04L 67/2804* (2013.01)

(58) Field of Classification Search
CPC ............. H04L 45/586; H04L 12/4633; H04L 12/4641; H04L 45/74; H04L 67/141
See application file for complete search history.

(56) References Cited

U.S. PATENT DOCUMENTS

| 8,495,199 | B2 | 7/2013 | Miller et al. | |
|---|---|---|---|---|
| 8,724,456 | B1* | 5/2014 | Hong | G06F 11/00 370/225 |
| 8,724,642 | B2 | 5/2014 | Miller et al. | |
| 8,959,203 | B1 | 2/2015 | Miller et al. | |
| 9,106,469 | B1 | 8/2015 | Miller et al. | |
| 9,141,947 | B1 | 9/2015 | Furr et al. | |
| 9,712,386 | B1 | 7/2017 | Chen et al. | |
| 2010/0046531 | A1* | 2/2010 | Louati | H04L 41/0806 370/401 |
| 2010/0111093 | A1* | 5/2010 | Satterlee | H04L 12/4641 370/401 |

OTHER PUBLICATIONS

U.S. Appl. No. 13/335,465, filed Dec. 22, 2011, Doane, et al.
U.S. Appl. No. 14/274,534, filed May 9, 2014, Shevade et al.
U.S. Appl. No. 14/274,477, filed May 9, 2014, Shevade et al.

(Continued)

*Primary Examiner* — Duc C Ho
(74) *Attorney, Agent, or Firm* — Robert C. Kowert; Meyertons, Hood, Kivlin, Kowert & Goetzel, P.C.

(57) ABSTRACT

A forwarding engine of a fleet of forwarding engines forwards packets received from outside a provider network via a direct physical link to a resource within the provider network. A virtual router of a fleet of virtual routers obtains routing metadata from a client-side networking device outside the provider network via a routing information exchange protocol and transmits the routing metadata to the forwarding engine, which uses the metadata to forward the packets. In response to a first trigger, the number of forwarding engines in the fleet is modified. In response to a second trigger, the number of virtual routers in the fleet is modified.

20 Claims, 12 Drawing Sheets

(56) References Cited

OTHER PUBLICATIONS

U.S. Appl. No. 14/274,546, filed May 9, 2014, Shevade et al.
U.S. Appl. No. 14/565,164, filed Dec. 9, 2014, Holgers et al.
ARISTA White Paper, "Virtual Extensible LAN (VXLAN) Overview," arista.com, 2016, pp. 1-7.
Amazon Web Services, "AWS Direct Connect User Guide," Nov. 2014, pp. 1-66.
Mahalingam, et al., "Virtual eXtensible Local Area Network (VXLAN): A Framework for Overlaying Virtualized Layer 2 Networks over Layer 3 Networks," Independent Submission, Aug. 2014, pp. 1-22.

* cited by examiner

DIRECT NETWORK CONNECTIVITY WITH SCALABLE FORWARDING AND ROUTING FLEETS

BACKGROUND

Many companies and other organizations operate computer networks that interconnect numerous computing systems to support their operations and the services they provide to their end customers distributed worldwide. In some data centers that have been set up to provide computing and/or storage facilities to remote clients or customers, the set of computational resources at the data center may be dynamically divided into resource pools, with each pool being made available for exclusive use by a given client or customer for designated periods of time. There are a number of alternatives available for how the consumers of these facilities establish network connectivity to the resource pools that have been designated for their use. Some of the connectivity pathways may have somewhat unpredictable performance, reliability and security characteristics.

For some types of service requests a reasonable variation in responsiveness and an occasional dropped connection may be acceptable. However, for many data transmissions, more stringent performance, reliability and security needs may exist. In such environments, a customer of the provider network may need a greater level of network isolation and control than is generally available over the public Internet. From the provider network operator's perspective, managing resources to handle traffic with such enhanced isolation for large (and dynamically changing) numbers of customers may present a non-trivial technical challenge.

Figure 1:
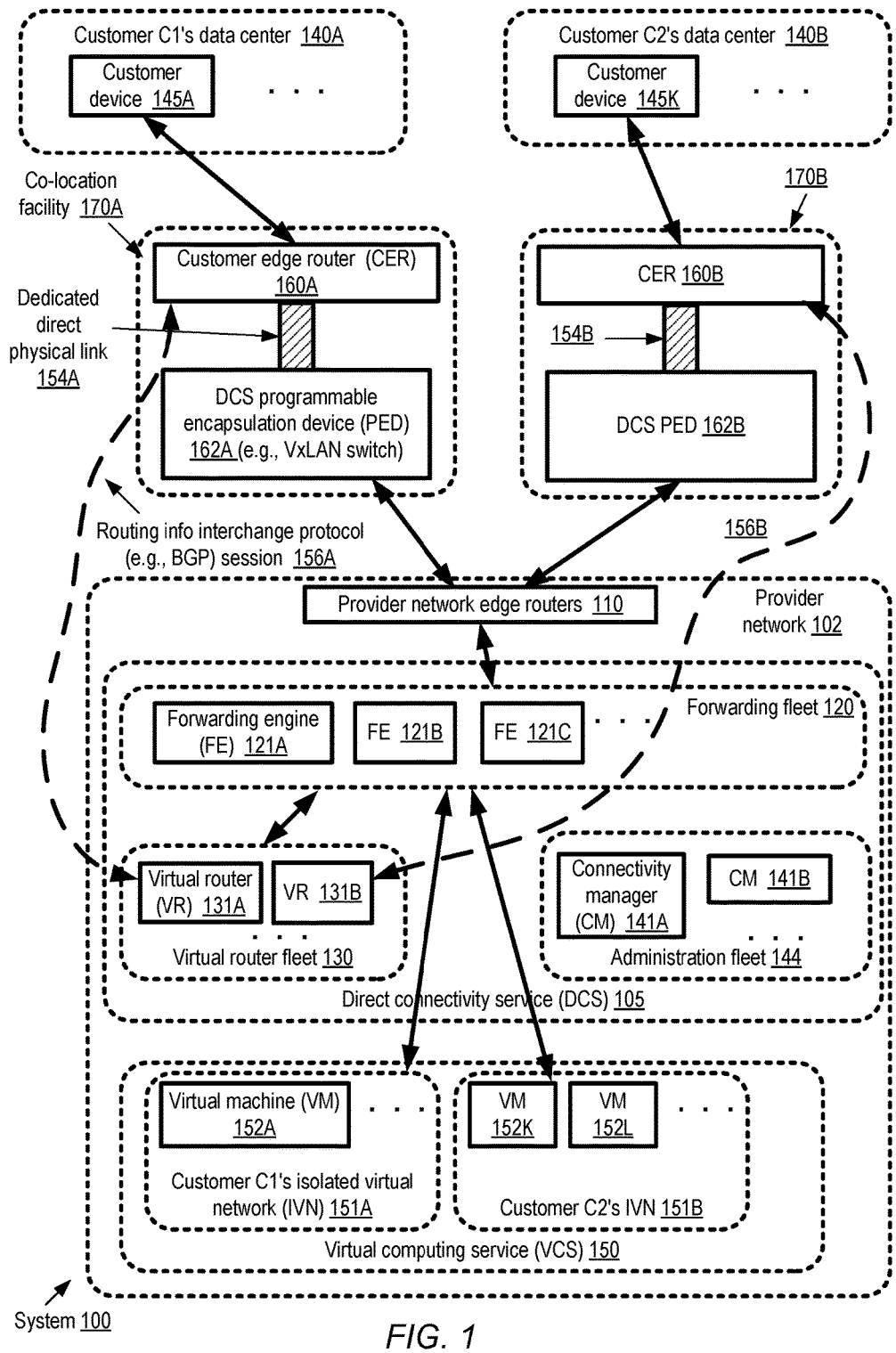
FIG. 1 illustrates an example system environment in which independently scalable forwarding and routing fleets may be established to support direct connections for customers of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for configuring and managing independently scalable fleets of forwarding devices and routing devices of a direct connectivity service, e.g., a service which supports the use of dedicated high-bandwidth physical links between customer networks and a provider network, are described. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

According to one embodiment, connectivity may be established between a customer's network (e.g., comprising some set of computing devices at customer-owned premises) and the customer's resources within the provider network (e.g., a set of virtual machines instantiated on behalf of the customer at a virtualized computing service of the provider network) via a high-bandwidth dedicated physical link at an equipment co-location facility. The dedicated physical link, which may also be referred to as a "direct connect" or "direct connection" link, may be set up between a customer's edge router and a networking device (e.g., a Virtual Extensible Local Area Network or VxLAN switch) owned or managed by the operator of the provider network in various embodiments. In one embodiment, dedicated physical links of various bandwidth capacities may be supported, such as 10 Gbit/second links, 1 Gbit/second links and the like, with the appropriate bandwidth being selected based for example on customer needs and/or equipment constraints at the co-location facility. In some embodiments, network packets originating at various computing devices (e.g., desktop computers, servers, and the like) of the customer network, intended to be transmitted to one or more resources allocated to the customer at the provider network, may be funneled to the customer's edge router, and from the customer's edge router to the provider network via the dedicated physical link. Similarly, network traffic originating at the customer's resources within the provider network, and intended for the computing devices within the customer's network may be directed via a number of intermediary devices to the provider network device at the co-location facility, and from there to the customer's network via the direct connect link. A number of transformations, such as encapsulations according to one or more protocols, may be applied to the raw or baseline packets sent in either direction in some embodiments as discussed below in further detail, and routing metadata may be exchanged between the provider network and the customer network to ensure that packets are directed appropriately in various embodiments. The use of the direct connect link may enable secure and high-performance communication between applications running within customer networks and applications running on behalf of the customer within the provider network in various embodiments. The set of provider network resources and associated algorithms used to establish and manage direct connect links may be referred to as a direct connectivity service (DCS) in some embodiments. In one embodiment, a DCS may be implemented as part of the functionality of a virtualized computing service (VCS) of a provider network. In other embodiments, a DCS may be implemented separately from the VCS, and may for example be used for direct connectivity between customer networks and resources at various provider network services including a VCS, a storage service, a database service and the like.

According to some embodiments, a system may comprise one or more administrative components of a direct connectivity service of a provider network, a fleet of forwarding engines of the DCS, and a fleet of virtual routers of the DCS. The administrative components may be referred to as connectivity managers in various embodiments. In some embodiments, as described below in further detail, a given forwarding engine and/or a given virtual router may be implemented at a virtual machine instantiated at a host of a VCS. In at least one embodiment, software containers, set up at virtual machines or directly on physical machines, may be used for virtual routers and/or forwarding engines. In other embodiments, neither virtual machines nor software containers may be utilized for the fleets.

A connectivity manager may be responsible for setting up nodes of the forwarding engine fleet and/or nodes of the virtual router fleet in various embodiments. At a high level, in various embodiments the virtual router fleet may be responsible for obtaining, from one or more sources including at least one device of a customer network, routing metadata pertaining to the customer's resources which are expected to participate in network traffic which utilizes the direct connect link, and propagating the routing metadata to the forwarding fleet. At a high level, the forwarding fleet may be responsible for receiving data packets (i.e., packets which may not comprise routing metadata) originally generated at the customer network and sent over a direct connect link, and forwarding such data packets towards the customer resources within the provider network in various embodiments. Similarly, in such embodiments, with respect to traffic flowing in the reverse direction, the forwarding fleet may be responsible for receiving data packets from the customer's resources within the provider network and forwarding them towards the customer network on a path which includes the direct connect link. The flow of traffic from a customer network external to the provider network towards resources within the provider network may be referred to as "inbound" or "southbound" traffic in some embodiments, while the flow of traffic from the provider network to the customer network may be referred to as "outbound" or "northbound" traffic. In at least some embodiments, the forwarding fleet may also participate in the exchange of routing information needed for the direct connect traffic to be routed appropriately, in both the inbound and the outbound directions. For example, inbound packets containing routing metadata from the customer network may be received at the forwarding fleet and sent on to the virtual router fleet, and outbound packets containing routing metadata associated with a customer's resources within the provider network may be sent on to customer networks from the virtual router fleet.

In various embodiments, a given virtual router of the virtual router fleet may establish, or participate in establishing, a session of a routing information exchange protocol, such as the External Border Gateway Protocol (EBGP) or one of various other versions or derivations of the Border Gateway Protocol (BGP), with a customer's router. Such a session may be used by the virtual router to obtain routing entries, mappings and/or other metadata which can be used to route packets in one or both directions between the provider network and the customer network, e.g., packets generated at a virtual machine of the provider network and targeted towards a computing device within the customer network. Such routing metadata may be propagated from the virtual router device to one or more routing repositories and/or caches within the forwarding fleet in various embodiments. In at least one embodiment, the forwarding fleet may receive routing entries, mappings and/or other routing metadata from administrative or control-plane components of one or more isolated virtual networks set up on behalf of the customer, e.g., in addition to or instead of receiving the routing metadata from the virtual routers.

The path taken by an inbound data packet from a computing device of the customer to a destination resource such as a virtual machine allocated to the customer within the provider network may be summarized as follows in various embodiments. The data packet, which may be referred to as a "baseline" or original packet, may be transmitted from its source computing device via the client network's links to an edge router of the customer at a co-location facility or other facility with a direct connect link to the provider network. The packet may be transmitted over the direct connect link to a networking device of the provider network. This initial networking device encountered by the baseline packet may be referred to as a programmable encapsulation device (PED) in various embodiments, as it may be responsible for enclosing the baseline packet within an encapsulation packet formatted according to a first encapsulation protocol such as VxLAN before the packet is sent on a path towards the destination virtual machine via a tunnel. In at least some embodiments, the PED may comprise a VxLAN switch. In various embodiments, as implied by its name, the PED may be programmable or configurable, e.g., via commands issued from the administrative components of the direct connectivity service. In at least one embodiment a VxLAN tunnel may in effect be established between a VxLAN switch used as the PED and the forwarding fleet of the DCS for direct connect traffic in either direction; the first encapsulation protocol used for traffic sent via this tunnel may also be referred to as a tunneling protocol.

The inbound encapsulation packet may be received at an edge router of the provider network in some embodiments, and sent by the edge router to a selected forwarding engine of the forwarding fleet of DCS. In at least one embodiment, a cluster comprising several distinct forwarding engines may be set up for a customer, e.g., for availability and/or performance reasons, and the edge router may invoke a load balancing algorithm to select the particular forwarding engine to which an inbound encapsulation packet is to be sent. The baseline packet may be extracted from the encapsulation packet, e.g., either at the edge router or at the selected forwarding engine in various embodiments. A different encapsulation protocol, such as the Generic Routing Encapsulation (GRE) protocol or a proprietary encapsulation protocol used within the VCS, may be used to create a second encapsulation packet containing the baseline packet in various embodiments, e.g., by the selected forwarding engine. The second encapsulation packet may be sent along an internal network path of the provider network in such embodiments, with the internal route being selected at the forwarding fleet. At least a portion of the internal route (e.g., one or more network hops) may be selected based at least in part on routing metadata received at the forwarding fleet from the virtual router fleet and/or other components of the provider network in various embodiments. The second encapsulation packet may eventually reach a virtualization management component of the host at which the destination virtual machine is instantiated in various embodiments. The virtualization management component may extract the baseline packet and transmit it to the destination virtual machine. In at least one embodiment, the virtualization management component may comprise an offloading peripheral device which reduces the virtualization-related workload of the main CPUs of the host by performing at least some network-related computations including encapsulating and de-encapsulating packets.

Traffic in the outbound direction may begin with a virtual machine generating a baseline packet intended for a destination computing device in the customer's external network in various embodiments. The virtualization management component may intercept the outbound baseline packet in some embodiments, and prepare an encapsulation packet containing the baseline packet according to a protocol such as GRE or a proprietary encapsulation protocol. A network address associated with the forwarding fleet may be set as the destination of the outbound encapsulation packet. At the forwarding fleet, the baseline packet may be extracted, and a second encapsulation packet formatted according to a different protocol (e.g., VxLAN) may be prepared, e.g., using routing metadata or mappings obtained at the forwarding fleet from the virtual routing fleet in various embodiments. The second encapsulation packet may be sent from an edge router of the provider network to the PED at the co-location facility, where the baseline packet may be extracted prior to sending the baseline packet to the customer's edge router via the direct connect link in at least some such embodiments. After the baseline packet reaches the customer's edge router, in various embodiments the customer network's networking infrastructure may be responsible for selecting the path to the destination computing device. In various embodiments, the transmissions in either direction between the forwarding fleet and the PED may utilize tunnels set up according to an encapsulation protocol selected by the PED.

In at least some embodiments, the forwarding fleet and/or the virtual routing fleet may comprise respective sets of clusters. For example, in one embodiment, for a given customer of the DCS, a cluster of K forwarding engine nodes may be set up initially, with the packet forwarding workload being split among the cluster nodes in one or both directions. Similarly, in one embodiment, a cluster of L virtual router nodes may be identified for a given customer, with the routing workload being split among the nodes of the cluster. In various embodiments, clusters of forwarding engines and/or clusters of virtual routers may be set up in advance, and assigned to customers as needed—e.g., new clusters need not necessarily be set up when a new direct customer is to be accommodated. In at least some embodiments, a multiplexed virtual network interface address may be assigned to a given forwarding engine cluster and/or to a virtual router cluster. As discussed below in further detail, such a multiplexed virtual network interface address may enable traffic directed to or from a single address such as an IP (Internet Protocol) version 4 or version 6 address to be distributed among several different computing devices. In at least one embodiment, a given forwarding engine or a cluster of forwarding engines may be configured in a multi-tenant manner, e.g., such that traffic of more than one DSC customer is potentially handled at the forwarding engine or the cluster. Similarly, in at least one embodiment, a given virtual router or virtual router cluster may be configured in a multi-tenant manner, e.g., such that routing information pertaining to more than one DSC customer may be obtained and/or propagated by the virtual router or the cluster. In other embodiments, at least some virtual routers, virtual router clusters, forwarding engines and/or forwarding engine clusters may be set up in single-tenant mode (i.e., for use by a single customer at a time rather than by multiple customers).

According to at least one embodiment, the forwarding engines and/or the virtual routers may have associated monitoring agents established, responsible for reporting various performance and availability metrics associated with the fleet members to the connectivity managers or other administrative components of the DCS. If an analysis of the metrics indicates that a particular threshold condition has been met, a connectivity manager may dynamically change (e.g., increase or decrease) the number of forwarding engines established for a given client, or for the forwarding fleet as a whole, without necessarily modifying the virtual router fleet in various embodiments. Similarly, in some embodiments, based on a determination that a threshold condition has been met, a connectivity manager may dynamically change (e.g., increase or decrease) the number of virtual routers established for a given client, or for the virtual routing fleet as a whole, without necessarily modifying the forwarding fleet in various embodiments. As such, the forwarding fleet and the virtual routing fleet may be scaled independently of one another in at least some embodiments. Of course, in various embodiments, changes may be made to both fleets concurrently as and when needed by a connectivity manager. In at least one embodiment, an increase in the number of forwarding engines may be appropriate, for example, when the rate at which data is being transmitted on behalf of some set of one or more customers increases beyond a threshold; similarly, if the data rate falls below a threshold, a reduction in the number of forwarding engines may be appropriate under some operating conditions. In some embodiments, an increase in the number of virtual routers may be appropriate if, for example, the total number of distinct DCS customers in some geography or in the provider network as a whole increases beyond a threshold. Each additional customer may, in such embodiments, require routing information interchange sessions to be set up and routing metadata to be collected and propagated, thereby increasing the workload on the virtual routing fleet even if the rate of data transferred on behalf of the new customer is not very high. Customers of various services of a provider network may be referred to as clients or users of the services, or as clients or users of the provider network, in various embodiments. Similarly, customer networks may be referred to as user networks, and customer-owned routers or equipment may be referred to as user-owned routers or equipment in various embodiments. A customer need not have a specific financial relationship with the service or provider network.

Example System Environment

FIG. 1 illustrates an example system environment in which independently scalable forwarding and routing fleets may be established to support direct connections for customers of a provider network, according to at least some embodiments. As shown, system 100 comprises various resources of several network-accessible services of a provider network 102 in the depicted embodiment, including a virtual computing service (VCS) 150 and a direct connectivity service (DCS) 105).

A VCS 150 may comprise a plurality of isolated virtual networks (IVNs) 151 established on behalf of respective customers in some embodiments. An isolated virtual network may comprise a collection of networked resources (including, for example, virtual machines) allocated to a given customer or client, which are logically isolated from (and by default, inaccessible from) resources allocated for other clients in other isolated virtual networks. The customer on whose behalf an IVN is established may be granted substantial flexibility regarding network configuration for the resources of the IVN—e.g., private IP addresses for application compute instances may be selected by the customer without having to consider the possibility that other resources within other IVNs may have been assigned the same IP addresses, subnets of the customer's choice may be established within the IVN, security rules may be set up by the customer for incoming and outgoing traffic with respect to the IVN, and so on. In the depicted embodiment, IVN 151A comprising at least one virtual machine 152A has been established for a customer C1 of the provider network, while IVN 151B comprising at least virtual machines 152K and 152L has been set up for a customer C2. One or more of the virtual machines may be instantiated at a given virtualization host of the VCS 150 in some embodiments. A given virtualization host (not shown explicitly in FIG. 1) may comprise a set of virtualization management components in various embodiments, such as for example a hypervisor, an administrative virtual machine running in a privileged authorization mode, and/or an offloading peripheral device which reduces the virtualization-related processing workload of the main processors or CPUs of the host.

Customers C1 and C2 may have computing resources outside the provider network 102 in the depicted embodiment, such as customer device 145A at C1's data center 140A and customer device 145B at C2's data center 140B. For various types of applications, the customers may wish to utilize secure dedicated pathways (e.g., instead of portions of the public Internet or other shared networks) for communications between their external computing devices 145 and the virtual machines 152 set up on their behalf within the VCS 150 in the depicted embodiment. The provider network 102 may implement a direct connectivity service (DCS) 105 to satisfy such connectivity requirements in various embodiments.

In the depicted embodiment, the DCS 105 may comprise at least four types of components or devices: an administration or control-plane fleet 144, a virtual router fleet 130, a forwarding fleet 120 and a set of programmable encapsulating devices (PEDs) 162 (e.g., 162A or 162B). The administration fleet 140 may comprise one or more connectivity managers (CMs) 141, such as CM 141A or CM 141B in the depicted embodiment, individual ones of which may be implemented using some combination of hardware and/or software elements. The virtual router fleet 130 may comprise one or more virtual routers (VRs) 131, such as VRs 131A and 131B, individual ones of which may be implemented using some combination of hardware and software elements in various embodiments. The forwarding fleet 120 may comprise one or more forwarding engines (FEs) 121 in some embodiments, such as FE 121A, 121B or 121C, individual ones of which may be implemented using some combination of hardware and/or software elements. Individual PEDs 162, such as PED 162A and PED 162B, may be configured at respective co-location facilities 170 (such as 170A or 170B) at which customer resources and provider network may share the same premises in the depicted embodiment. A given PED 162 may comprise one or more computing devices and associated software modules in at least some embodiments—e.g., a respective VxLAN switch may be used for each of the PEDs in one embodiment. In embodiments in which a VxLAN switch is deployed as the PED, a VxLAN tunnel may be established between the VxLAN switch and the forwarding fleet of the DCS for direct connect traffic.

In at least some embodiments, a customer who wishes to utilize direct connectivity between their external resources (e.g., computing devices 145) and their provider network resources (e.g., virtual machines 152) may submit requests, e.g., via programmatic interfaces, to the provider network 102. One or more co-location facilities 170 which are convenient (e.g., connectable to the customer's data centers via third-party network service providers, or via the customer's own existing networking infrastructure) for the customers may be identified in some embodiments, and configuration of the direct connectivity may be initiated. A secure direct dedicated physical network link 154, such as link 154A or 154B, may be established between a customer's edge router (CER) 160 and a co-located PED at a co-location facility 170 in various embodiments. For example, in the depicted scenario, CER 160A is connected via dedicated physical link 154A to PED 162A at co-location facility 170A on behalf of customer C2, while CER 160B is connected via dedicated physical link 154B to PED 162B at co-location facility 170B on behalf of customer C2. Customer edge routers 160 may represent one example of client-side networking devices which may participate in direct connect traffic management in various embodiments; other examples of client-side networking devices may include internal routers, gateways, switches or the like within the customer network or within the customer portion of a co-location facility in some embodiments.

In order for network packets to be routed correctly between customer computing devices 145 and virtual machines 152 in both directions, routing metadata may be exchanged between the customer networks and the provider network 102 in the depicted embodiment. For example, one or more sessions 156 of a routing information interchange protocol may be set up between CERs 160 and VRs 131. As shown, in the depicted embodiment, session 156A may be established between CER 160A of customer C1 and VR 131A, while session 156B may be established between CER 160B of customer C2 and VR 131B. In at least some embodiments, variants or extensions of the Border Gateway Protocol (BGP) (such as External BGP or EBGP) may be used for exchanging or advertising routing information. In effect, in the depicted embodiment, the CERs may inform the VR regarding routes and addresses associated with a first set of devices in the customer network, while the VR may inform the CER regarding routes and addresses of a second set of devices in the VCS 150 which are configured or permitted to communicate with devices of the first set. The routing information, which may comprise one or more routing elements or table entries, obtained at the virtual router fleet 130 may be propagated to the appropriate set of forwarding engines of forwarding fleet 120 in the depicted embodiment. In at least one embodiment, the forwarding fleet 120 may also receive at least some routing metadata from sources other than the VR fleet—e.g., some routing information may be provided to the forwarding fleet from the IVNs 151 or from control-plane components of the VCS 150.

In the depicted embodiment, a connectivity manager 141 may be responsible for identifying or establishing the initial set of one or more forwarding engines 121 to be used on behalf of a given DCS customer such as C1, and the initial set of one or more virtual routers 131 to be used on behalf of a given customer. After the initial sets of FEs 121 and VRs 131 have been identified, one or more sessions 156 may be set up between the VRs 131 and the customer edge routers 160, with the session traffic in both directions being forwarded by the FEs 121 in at least some embodiments. A VR 131 of the set may periodically (e.g., at regular intervals, or whenever new or updated routing information is received) propagate the routing metadata or entries obtained from the customer network to the FEs 121 of the set in various embodiments. The FEs 121 in turn may use the routing information obtained from the VRs 131 to determine how and where to forward inbound packets as well as outbound packets in various embodiments.

In at least some embodiments, more than one encapsulation protocol may be used for traffic which passes through the dedicated direct connect links 154. For example, a baseline packet (e.g., an IPv4 or IPv6 packet) received from a CER 160 via direct connect link 154 may be encapsulated according to a first protocol (such as VxLAN) at a PED 162 and then transmitted to an edge router 110 of the provider network 102. Either at the edge router 110 or at an FE 121 to which the first encapsulation packet is sent, the inbound baseline packet may be extracted from the first encapsulation packet in at least some embodiments. A second encapsulation packet, formatted for example according to the GRE protocol or according to a proprietary protocol of the provider network, comprising the baseline packet may be generated and transmitted along a route to a destination virtual machine 152. The inbound route, or at least one or more hops of the route, may be determined at least in part based on the routing metadata received at the forwarding fleet in various embodiments. The second encapsulation packet may be examined at a virtualization management component of the host at which the destination virtual machine 152 runs in the depicted embodiment. The baseline packet generated at the customer network may be extracted from the second encapsulation packet at the virtualization management component, and provided to the destination virtual machine.

Traffic in the reverse or outbound direction, e.g., from a virtual machine 152 within an IVN 151 to a customer's computing device 145 outside the provider network, may also be encapsulated at two stages in at least one embodiment. In general, the reverse pathway to that described above for inbound packets may be taken in various embodiments. For example, the virtualization management component may intercept a baseline outbound packet, and generate an encapsulation packet using GRE or the proprietary protocol in one embodiment. The encapsulation packet may be directed to an FE 121, which may extract the outbound baseline packet, re-encapsulate it according to VxLAN, and send it via an edge router 110 to the appropriate PED 162, e.g., using the routing metadata available at the forwarding fleet 120 in various embodiments. In one embodiment, at least some of the work associated with the second encapsulation may be performed at an edge router 110 instead of or in addition to being performed at the forwarding engine 121. At the PED, the original outbound baseline packet may be extracted from the second encapsulation packet and transmitted over the direct connect link 154 to the customer's network in the depicted embodiment.

In the depicted embodiment, connectivity managers 141 may collect and analyze a variety of monitored metrics associated with the forwarding engines 121, the virtual routers 131 and/or other components of the DCS 105. Based on results of the analysis, the connectivity managers may implement various types of configuration changes in some embodiments, such as adding, removing or redeploying (e.g., from one customer to another) one or more forwarding engines, or one or more virtual routers. In at least one embodiment, the administrative fleet may implement a set of reconfiguration rules which indicate triggering conditions for various types of configuration changes, such as the threshold of traffic which requires an addition forwarding engine to be set up for a given customer, or the threshold of customer count or routing message traffic which requires an additional virtual router to be set up. By dynamically adjusting the number of forwarding engines and virtual routers independently of one another, the connectivity manager may be able to respond to changing traffic patterns and changing customer sets efficiently in various embodiments. In one embodiment, a pool of partially (or fully) pre-configured forwarding engines or virtual routers may be maintained, so that for example the time taken to add new resources to the forwarding fleet or the virtual router fleet is reduced or minimized. In various embodiments, the forwarding engines and/or the virtual routers may implemented in a stateless or near-stateless manner, such that upon failure of a given forwarding engine or virtual router, a replacement can be deployed very quickly without having to recover much or any state information from a backup location. In at least some embodiments, the VCS, which may be designed to provide very large numbers of computing platforms efficiently, may itself be used for the forwarding fleet and the virtual router fleet as discussed below in further detail, which may reduce or eliminate (for most operating conditions) DCS fleet scaling limitations. A number of additional details regarding the configuration and operation of various aspects of the DCS 105 in various embodiments, such as the use of multiplexed virtual network interfaces and load balancing, are provided below.

It is noted that in some embodiments, the physical locations of one or more components involved in the configuration and flow of traffic over dedicated direct physical links between customer networks and the provider network 102 may differ from the locations shown in FIG. 1. For example, in one embodiment, a customer edge router 160 may be located at a customer data center rather than at a co-location facility 170. In some embodiments, programmable encapsulation devices 162 such as VxLAN switches may be located at a data center of the provider network 102 rather than at a co-location facility 170. In some embodiments, one or more edge routers 110 of the provider network (or subcomponents of such edge routers) may be set up at a co-location facility 170, e.g., in addition to or instead of being set up within a data center of the provider network. In one embodiment, a dedicated direct physical link 154 may be set up between a customer data center 140 and a provider network data center, and a co-location facility may not be required.

Fleet Distribution Among Availability Containers

Figure 2:
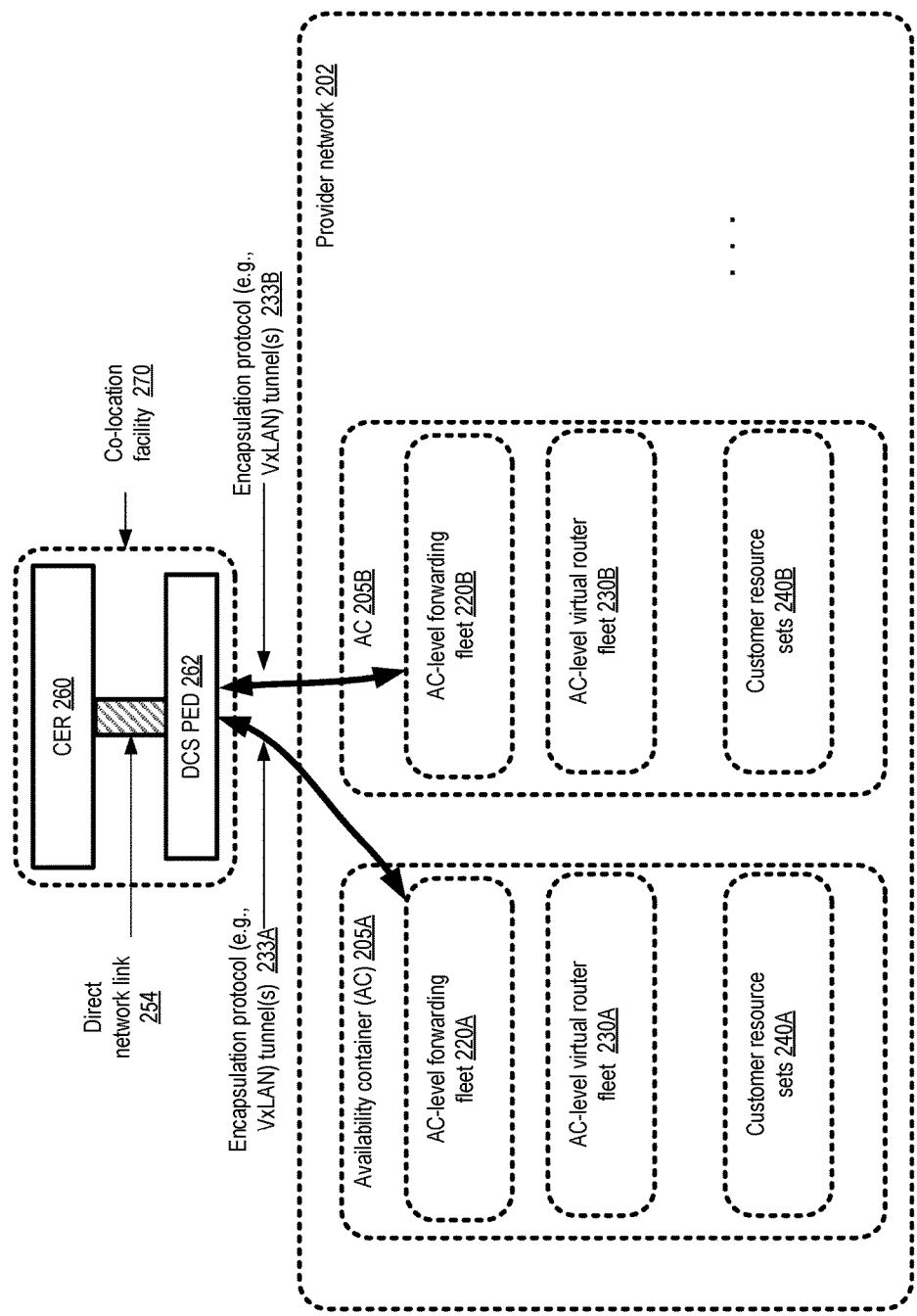
FIG. 2 illustrates examples of forwarding and routing resources which may be distributed among a plurality of availability containers of a provider network, according to at least some embodiments.

FIG. 2 illustrates examples of forwarding and routing resources which may be distributed among a plurality of availability containers of a provider network, according to at least some embodiments. In some embodiments, a provider network at which a DCS 105 is implemented may be organized into a plurality of geographical regions, and each region may include one or more availability containers, which may also be termed availability zones. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances or subcomponents in respective availability containers.

In the embodiment depicted in FIG. 2, provider network 202 comprises at least two availability containers (ACs) 205A and 205B. Customer resources, such as resource sets 240A and 240B, may be distributed among the different availability containers, e.g., to ensure that applications running in behalf of the customers can survive failures of a single availability container 205. The forwarding fleet of the DCS of provider network may be split into AC-level fleets, such as AC level forwarding fleets 220A at AC 205A, and AC-level forwarding fleet 220B at AC 205B in the depicted embodiment. Similarly, in at least some embodiments, AC-level virtual router fleets such as 230A and 230B may be set up at the respective availability containers. The distribution of the DCS fleets among the availability containers may be helpful in various embodiments, not just for availability reasons (e.g., enabling forwarding engines or virtual routers in a different availability container to take over from failed forwarding engines or virtual routers) but also for performance reasons. For example, establishing at least some forwarding engines in each availability container at which a customer's resources are located may help to reduce network latencies for traffic sent over direct connect links, since the customer's traffic may potentially be directed to (or from) any of the availability containers.

As shown, in the embodiment depicted in FIG. 2, respective encapsulation protocol tunnels (e.g., VxLAN tunnels) 233A and 233B may be established for a given customer whose provider network resources are distributed across the availability containers 205A and 205B. For inbound traffic, an encapsulation tunnel 233A may be used for traffic received from customer edge router 260 via a direct network link 254 at a programmable encapsulation device 262 of co-location facility 270 and directed towards availability customer resource set 240A in availability container 205A, while tunnel 233B may be used for inbound traffic directed towards customer resource set 240B in availability container 205B. Similarly, for outbound traffic, the respective tunnels 233A and 233B may be used for traffic originating at customer resource sets 240 within the corresponding availability container 205 and directed towards the customer's network in the depicted embodiment.

Forwarding Engine Clusters

Figure 3:
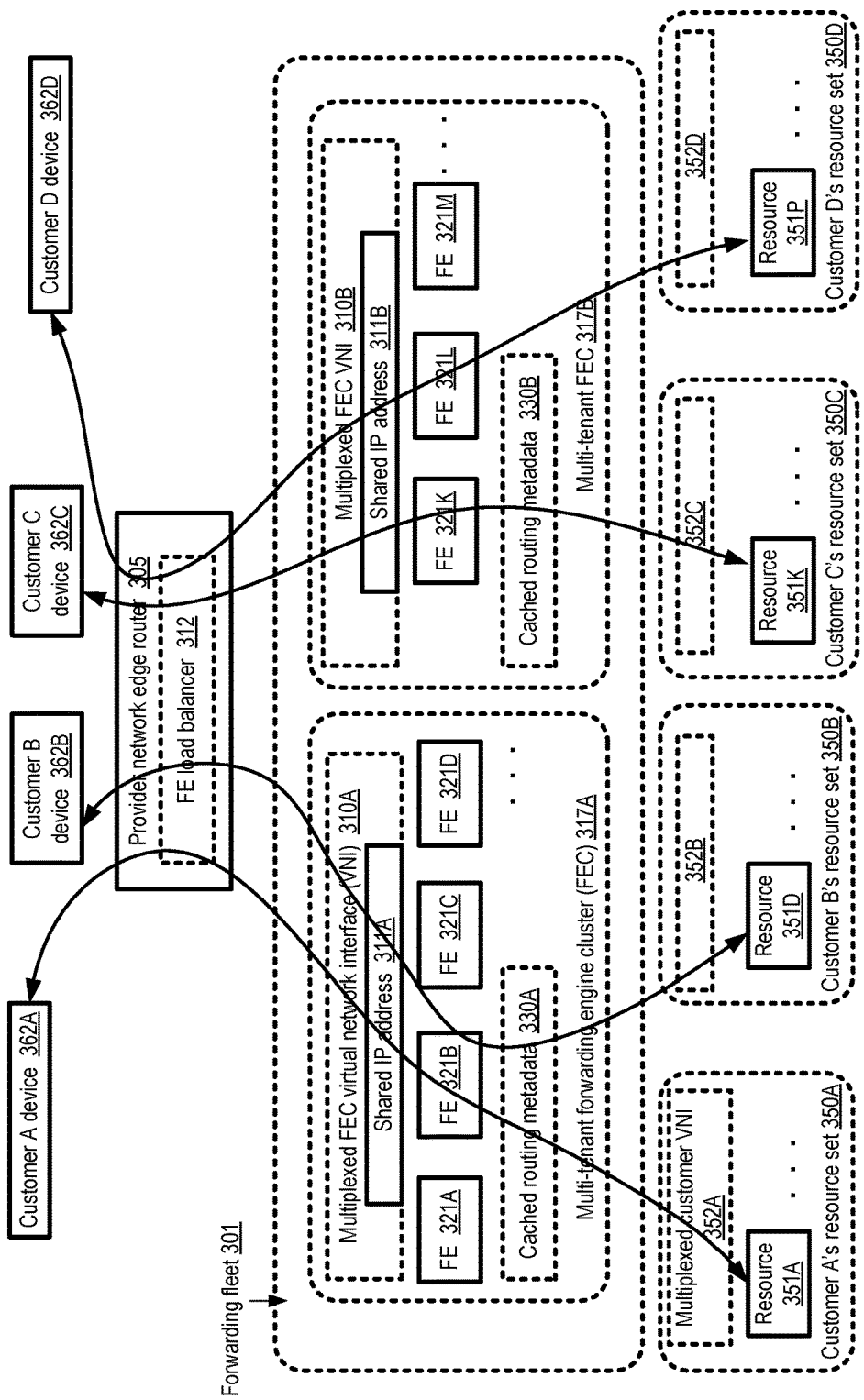
FIG. 3 illustrates examples of forwarding engine clusters which may be established for traffic over direct connections to a provider network, according to at least some embodiments.

In some embodiments, respective groups of forwarding engines may be organized as logical clusters for customers of a direct connectivity service. FIG. 3 illustrates examples of forwarding engine clusters which may be established for traffic over direct connections to a provider network, according to at least some embodiments. In the depicted scenario, two forwarding engine clusters (FECs) 317A and 317B may have been configured in multi-tenant mode in forwarding fleet 301 of a provider network—that is, each of the clusters may be used for direct connect traffic of more than one customer. FEC 317A comprises forwarding engines (FEs) 321A, 321B, 321C and 321D, while FEC 317B comprises FEs 321K, 321L and 321M. Direct connect traffic (i.e., network packets which flow in either direction between a given customer's devices located outside the provider network, and the customer's resources within the provider network) of at least four customers A, B, C and D is transmitted via FECs 317A and 317B collectively in the depicted embodiment.

Inbound or outbound traffic between device 362A (which belongs to customer A) and customer A's resource set 350A within the provider network may flow through FEC 317A in the depicted embodiment. Similarly, inbound or outbound traffic between device 362B (which belongs to customer B) and customer B's resource set 350B within the provider network may also flow through FEC 317A. In contrast, inbound or outbound traffic between customer device 362C of customer C and resource set 350C of customer C is processed and forwarded at FEC 317B, as is traffic in both directions between customer D's device 362D and customer D's resource set 350D. In the depicted embodiment, resources 351 (e.g., 351A, 351D, 351K and 351P) in the customer resource sets 350 may comprise, but may not necessarily be limited to, virtual machines instantiated at a VCS. For example, direct connect traffic may flow between customer networks and data store instances set up at a database service of the provider network, storage devices set up at a storage service, and so on in various embodiments.

In the depicted multi-tenant scenario, a given forwarding engine 321 at a given cluster 317 may be used for forwarding packets directed to or from a customer network of one of several customers. Thus, as suggested by the arrows indicative of packet flows passing through FEC 317A, forwarding engine 321B may be used for traffic of customer A as well as for traffic of customer B. In other embodiments, individual forwarding engines 321 of a multi-tenant cluster 317 may be designated for traffic associated with a single customer under normal operating conditions, although such a restriction may be relaxed in the event of a failure of one of the forwarding engines of the cluster or under certain overload levels.

The workload associated with direct connect traffic of the set of customers for whom a multi-tenant forwarding engine cluster 317 is established may be distributed among the forwarding engines which are members or nodes of the cluster according to various load balancing algorithms in different embodiments. In the depicted embodiment, a multiplexed virtual network interface device (VNI) may be configured for each of the FECs 317, such as VNI 310A for FEC 317A and VNI 310B for FEC 317B. A VNI may comprise a logical entity with a set of networking and security-related attributes that can be attached to (or detached from) one or more virtual machines or other network-connected devices programmatically. For example, at least one IPv4 or IPv6 address may be assigned to a given virtual network interface, and security rules restricting inbound and outbound traffic may be set for the VNI. In the embodiment depicted in FIG. 3, multiple forwarding engines such as FEs 321A-321D are attached to a given VNI 310A, and the VNI 310A may act as a multiplexor, such that traffic directed to an IP address 311A of the VNI 310A may be distributed among the different FEs to which it is attached without requiring IP addresses of the individual FEs to be employed by the sender of the traffic packets. Similarly, multiplexed VNI 310B may be established for FEs 321K-321M of FEC 317B in the depicted embodiment, enabling a single shared IP address 311B to be used as the destination address for packets directed to the cluster 317B, without requiring IP addresses of the individual FEs 321K-321M to be used by the sender. In some embodiments, a load balancing algorithm may be implemented by a forwarding engine load balancer 312 incorporated within a provider network edge router 305—e.g., although the shared IP address 311 of a destination FE cluster 317's VNI may be indicated in the encapsulation packet received at the provider network edge router, the edge router may select the particular cluster node to which a given packet is to be transmitted. In other embodiments, load balancing may be implemented at a component of the FEC 317—e.g., a software module running at an front-end load balancer of the FEC (not shown in FIG. 3) may be responsible for processing packets which have the VNI's IP address as the destination address, and selecting the particular FE to which a given packet should be transmitted.

In at least some embodiments, the FEs 321 within a given FEC 317 may be used for failure recovery in addition or instead of being used for balancing the workload. For example, if one of the FEs 321 of a given FEC 317 fails, its workload may be redistributed or failed over to one or more of the remaining FEs of the cluster at least temporarily.

In the depicted embodiment, a respective cache of routing metadata received from one or more sources such as a virtual router fleet may be maintained for each forwarding engine cluster 317. For example, cached routing metadata 330A may be maintained at FEC 317A, while cached routing metadata 330B may be maintained at FEC 317B. In some embodiments, the cached metadata may be replicated locally at each of the FEs of the cluster. The cached routing metadata may be used to determine routes for the direct connect traffic packets in either direction in the depicted embodiment.

As shown, in at least some embodiments a respective multiplexed VNI may be set up for each of several customer resource sets—e.g., multiplexed customer VNIs 352A-352D may be set up for customer resource sets 350A-350D respectively. When forwarding a packet from an FEC 317 towards a customer resource set, an IP address of the corresponding VNI 352 may be used as the destination address in the depicted embodiment. The particular virtualization host to which a given packet which had the customer VNI's IP address as its destination is to be directed may be determined at logic implementing the customer VNI in such embodiments. In the outbound direction, in at least some embodiments, the virtualization management component at the host where the outbound baseline packet is generated may select the particular FE 321 of the appropriate cluster 317 to which the outbound packet is to be directed. The source address of the outbound packet may be set to the IP address of the customer VNI 352 in at least one such embodiment.

In some embodiments, a number of partially pre-configured FECs may be set up at the DCS, and assigned to individual customers upon approval of direct connect access for the customer. After an FEC is assigned, the customer-specific aspects of configuration of some or all of its forwarding engines may be completed in such embodiments. Such an approach may, for example, reduce the amount of time taken to allow direct connect traffic to flow between the customer networks and the provider network.

Virtual Router Clusters

Figure 4:
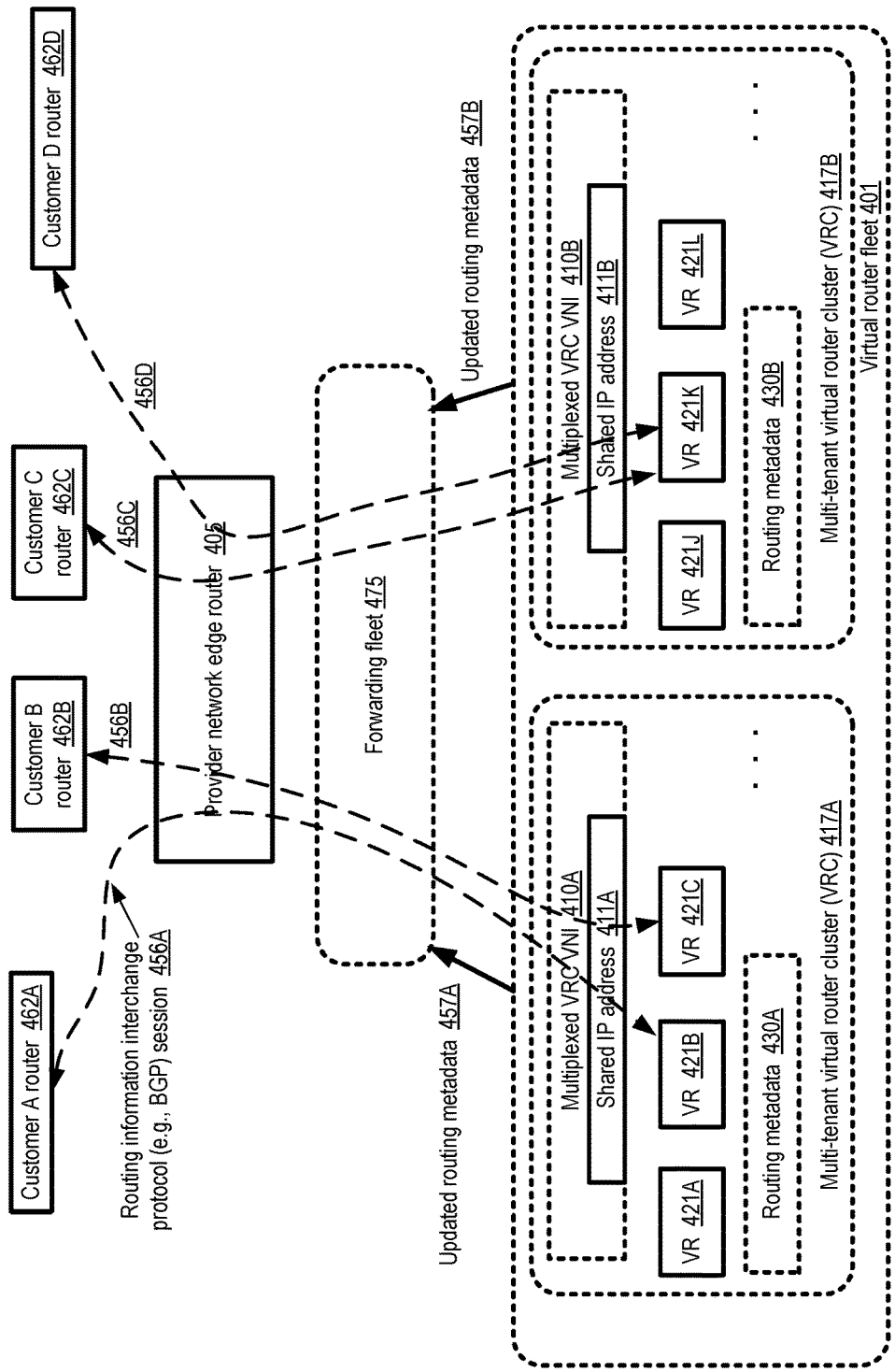
FIG. 4 illustrates examples of virtual router clusters which may be established for traffic over direct connections to a provider network, according to at least some embodiments.

In some embodiments, respective groups of one or more virtual routers may be organized as logical clusters for customers of a direct connectivity service. FIG. 4 illustrates examples of virtual router clusters which may be established for traffic over direct connections to a provider network, according to at least some embodiments. In the depicted scenario, two virtual router clusters (VRCs) 417A and 417B may have been configured in multi-tenant mode in virtual router fleet 401 of a provider network—that is, each of the clusters may be used for obtaining and propagating routing metadata associated with direct connect traffic of more than one customer. VRC 417A comprises virtual routers (VRs) 421A, 421B, and 421C, while VRC 417B comprises VRs 421J, 421K, and 421L. Routing information pertaining to resources of at least four customers A, B, C and D may be obtained at and propagated from VRCs 417A and 417B in the depicted embodiment.

Four sessions of a routing information interchange protocol are indicated in FIG. 4, corresponding to one of the four customers respectively. Session 456A may be established between a customer A router 462A (i.e., a router within customer A's external network, such as a customer edge router in the co-location facility used for the direct connect link) and a VR 421B in the depicted embodiment. Similarly, session 456B may be established between customer B router 462B and a VR 421C, session 456C may be established between customer C router 462C and VR 421K, while session 456D may be established between customer D router 462D and VR 421K. As shown, a given VR 421 may be used for routing data interchange sessions associated with multiple customers in the depicted embodiment. In other embodiments, individual VRs 421 of a multi-tenant cluster 417 may be designated for processing routing data associated with a single customer under normal operating conditions, although such a restriction may be relaxed in the event of a failure of one of the virtual routers of the cluster or under certain overload levels.

In the depicted embodiment, the packets associated with the sessions 456 may be transmitted via path which comprises the forwarding fleet 475 and the provider network edge router 405. In other embodiments, a different pathway may be used for routing metadata than is used for data packets. In some embodiments, each VRC 417 may maintain a respective repository comprising routing metadata received from the customer routers and/or other sources (such as control-plane components of various services of the provider network including a virtualized computing service). For example, collected routing metadata 430A may be stored at a repository accessible from VRs of VRC 417A, while collected routing metadata 430B may be stored at a repository accessible from VRs of VFRC 417B. A VRC may propagate updated routing metadata to the appropriate subsets of forwarding engine fleet in various embodiments, as indicated by arrows 457A and 457B.

In the depicted embodiment, a respective multiplexed virtual network interface (VNI) 410, such as 410 or 410B, may be configured for each of the VRCs 417. As in the case of the FEC VNIs discussed in the context of FIG. 3, a single IP address 411 (e.g., 411A or 411B) of the VRC VNI 410 may be used as the destination address for packets directed to a given VRC in the depicted embodiment. The packets containing routing metadata which are directed to the shared IP address 411 of a given VRC's VNI 410 may be automatically distributed among the VRs of the VRC in the depicted embodiment, without requiring the IP addresses of the VRs themselves to be specified as the destination addresses of the packets by a sender such as a forwarding engine.

In some embodiments, a number of partially pre-configured VRCs may be set up at the DCS, and assigned to individual customers upon approval of direct connect access for the customer. After a VRC is assigned, the customer-specific aspects of configuration of some or all of its virtual routers may be completed in such embodiments. Such an approach may, for example, reduce the amount of time taken to allow direct connect traffic to flow between the customer networks and the provider network.

Example Packet Pathways

Figure 5:
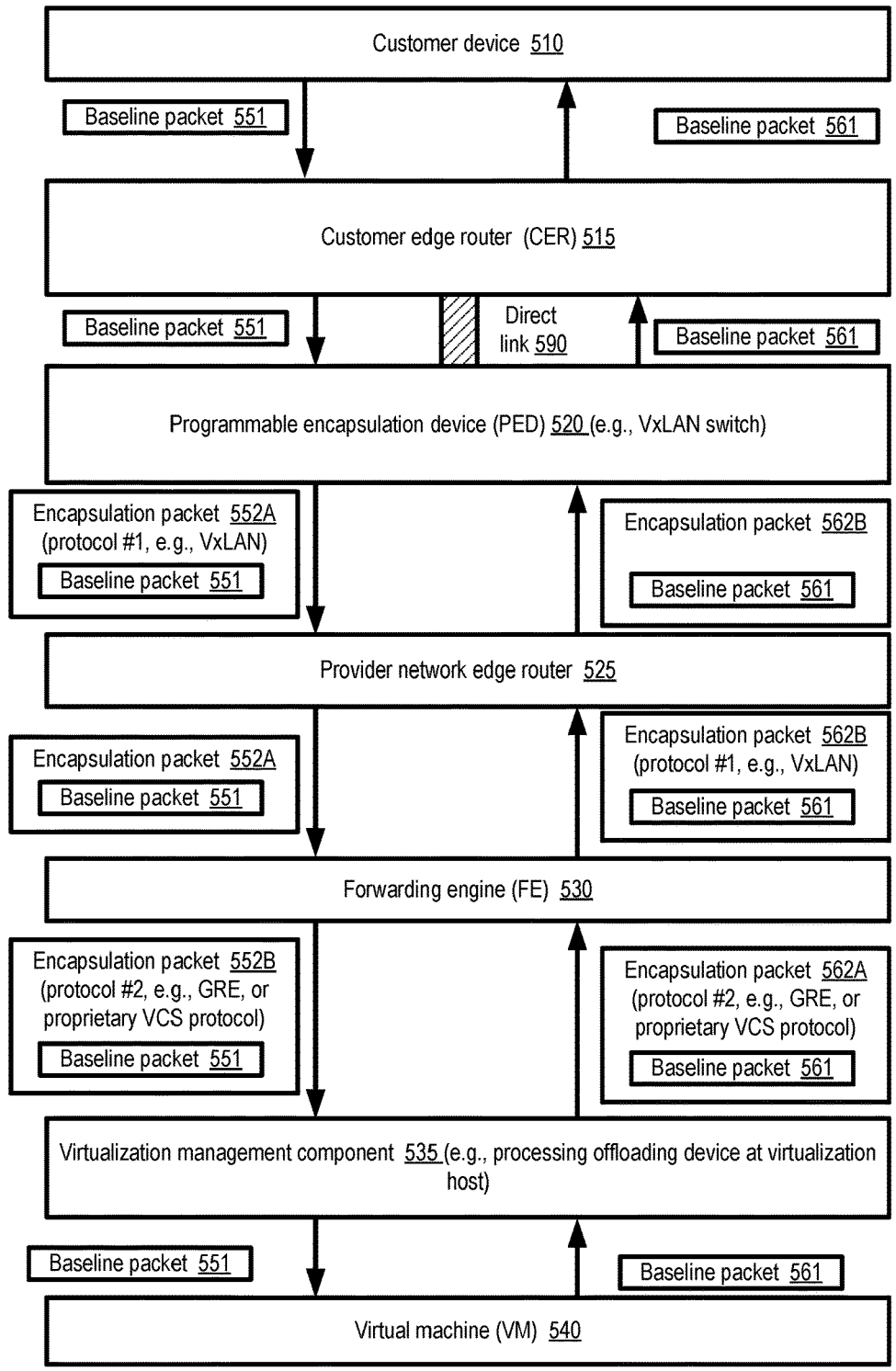
FIG. 5 provides a simplified overview of example data packet paths for direct connectivity traffic into and out of a provider network, according to at least some embodiments.

FIG. 5 provides a simplified overview of example data packet paths for direct connectivity traffic into and out of a provider network, according to at least some embodiments. An example inbound path for a baseline data packet generated at a customer device outside the provider network and directed to the customer's virtual machine within the provider network is shown on the left of FIG. 5. A corresponding example outbound path for a baseline data packet generated at the virtual machine and directed to the customer device outside the provider network is shown towards the right.

A baseline inbound packet 551 (e.g., a packet formatted according to the Transmission Control Protocol/Internet Protocol or TCP/IP suite) may be generated, for example on behalf of an application, at customer device 510 and transmitted along the customer network's internal links to a customer edge router CER 515 in the depicted embodiment. In some embodiments, the baseline packet may be transformed or encapsulated in the customer network before it reaches the CER 515, where the original baseline packet may be extracted for transmission towards the provider network.

From the CER 515, the baseline packet 551 may be transmitted over the dedicated physical link 590 (the direct connect link configured for the customer) to a co-located programmable encapsulation device or PED 520, such as a VxLAN switch in the depicted embodiment. At the PED 520, a first encapsulation packet 552A containing the baseline packet 551 may be prepared in accordance with a first encapsulation or tunneling protocol such as VxLAN. In embodiments in which VxLAN is used as the first encapsulation protocol, the PED may serve as one endpoint of a VxLAN tunnel, with a forwarding engine of the direct connectivity service serving as the other endpoint. In some embodiments, an IP address of a multiplexed virtual network interface of a forwarding engine cluster designated for the customer may be indicated as the destination address of packet 552A.

The first encapsulation packet 552A may be sent via a provider network edge router 525 to a forwarding engine 530 of the direct connectivity service of the provider network in the depicted embodiment. As mentioned earlier, in embodiments in which a cluster of forwarding engines is set up on behalf of the customer, one of the forwarding engines of the cluster may be selected (e.g., by the provider network's edge router 525) using a load balancing algorithm. Any of a variety of load balancing algorithms may be employed in different embodiments—e.g., a round-robin algorithm may be used, a random selection algorithm may be used, or one or more header values of packet 552A may be hashed to determine which particular forwarding engine of the cluster should be selected as the destination.

In the depicted embodiment, the baseline packet 551 may be extracted from the encapsulation packet 552A at the forwarding engine 530, and included within a second encapsulation packet 552B formatted according to a different protocol, such as the GRE protocol or a proprietary protocol of the provider network. In other embodiments, at least part of the work involved in extracting the baseline packet and re-encapsulating it may be performed at the provider network edge router 525. In one embodiment, the same encapsulation protocol that was for the first encapsulation packet may be re-used at the forwarding engine.

Using the routing metadata available to it (at least part of which may have been transmitted to it from the virtual router fleet), the forwarding engine 530 may forward the second encapsulation packet 552B towards a host at which the destination virtual machine 540 is instantiated within the provider network in the depicted embodiment. A virtualization management component 535 (e.g., a processing offloading peripheral device that does network-related virtualization management tasks) may obtain the encapsulated packet 552B, extract the baseline packet 551, and provide the baseline packet to the virtual machine 540 in at least some embodiments.

With respect to an outbound baseline packet 561 generated at the virtual machine, a first encapsulated packet 562A may be generated at the virtualization management component 535 according to the same protocol that was used for packet 552B in at least some embodiments. The encapsulated packet 562A may be sent to a forwarding engine 530, where the baseline outbound packet 561 may be extracted and re-encapsulated according to the protocol used for the tunnel between the forwarding engine and the PED.

It is noted that at least in some embodiments, a different forwarding engine may be used for an outbound packet between the same endpoints than was used for the inbound packet—for example, from among a cluster comprising forwarding engines FE1 and FE2, FE1 may be used for some inbound packets, while FE2 may be used for some outbound packets. This second outbound encapsulated packet 562B may be transmitted via the provider network edge router 525 to the PED 520 in the depicted embodiment. At the PED 520, the baseline outbound packet 561 may be extracted and sent over the direct connect link 590 to the customer edge router 515. After it has entered the customer network at the customer edge router, the baseline outbound packet 561 may be routed according to the techniques used within the customer network to the targeted customer device 510.

It is noted that the pathways shown in FIG. 5 have been simplified to emphasize the main operations and transformations involved in transferring direct connect data packets in at least some embodiments. Details such as the intermediary devices through which the packets may pass between the forwarding engines and the virtualization hosts, transformations that may be performed on inbound packets at the provider network edge routers, load balancing techniques which may be used at various stages, and the like in various embodiments have not been shown in FIG. 5.

A similar set of inbound and outbound paths to those shown in FIG. 5 may be used for routing metadata packets which are exchanged between customer routers and virtual routers of the direct connectivity service via sessions of routing data interchange protocols such as EBGP in some embodiments. In some embodiments, the manner in which the second phase of encapsulation is performed for inbound packets (and/or the first phase of encapsulation for outbound packets) may differ slightly for routing metadata packets than for packets containing customer application data. For example, in one embodiment, when dealing with an inbound routing metadata packet encapsulated according to VxLAN, the VxLAN packet may itself be encapsulated according to the second encapsulation protocol such as GRE at a forwarding engine without being de-encapsulated first. In the latter scenario, the VxLAN packet may be extracted from the second encapsulation packet, e.g., at a virtualization management component associated with a virtual router, and then the routing data itself may be extracted from the VxLAN packet at the virtual router in such an embodiment. Similarly, in the reverse or outbound direction, in some embodiments routing metadata being sent to a customer network from a virtual router may be included in a VxLAN packet encapsulated within a GRE packet by a virtualization management component. At the forwarding fleet or an edge router, in one such embodiment, the outbound VxLAN packet may be extracted from the GRE packet and sent on a path (which includes the direct connect link) to the customer network.

Implementation Alternatives for Forwarding Engines and Virtual Routers

Figure 6:
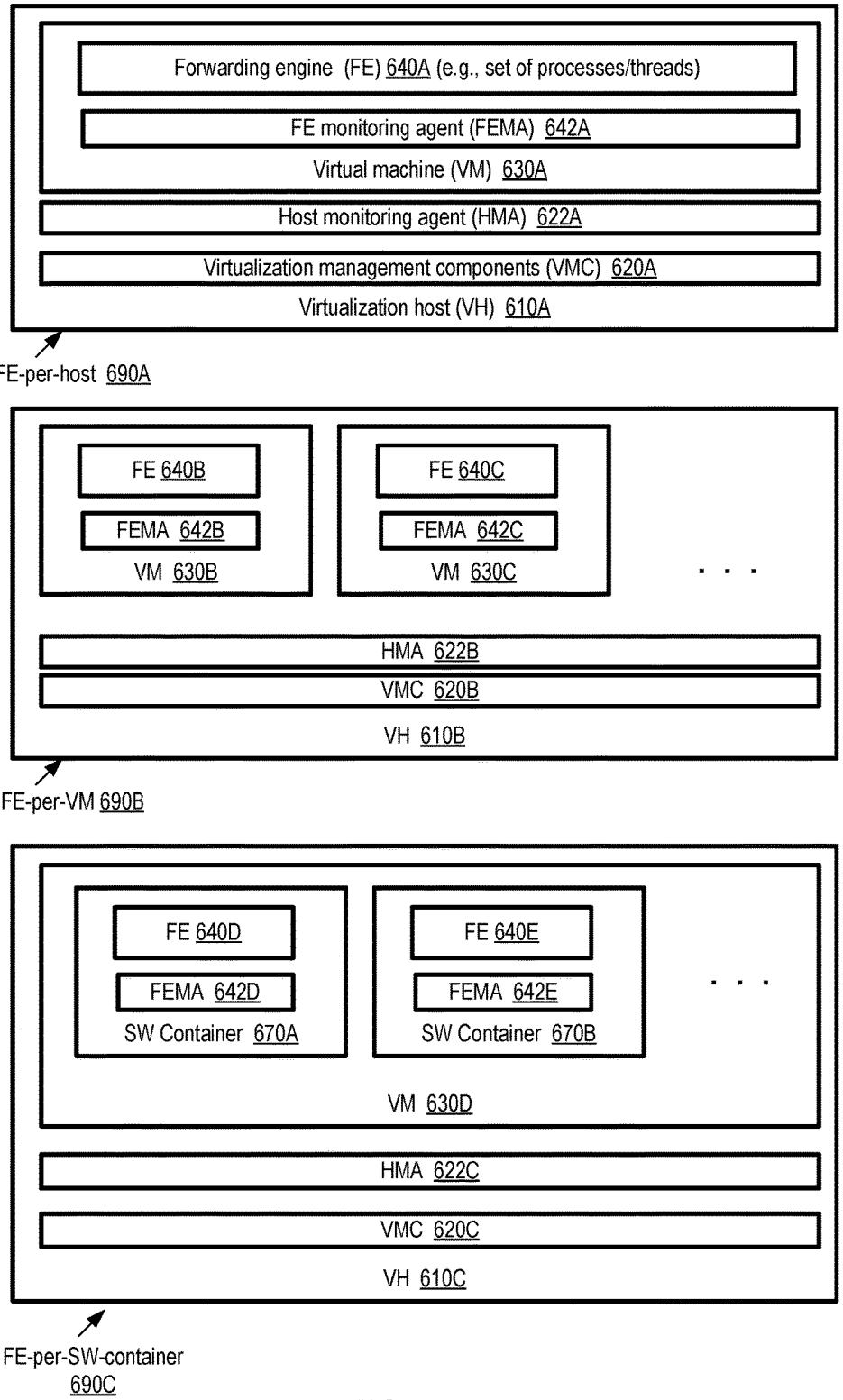
FIG. 6 illustrates examples of alternative implementation choices for forwarding engines, according to at least some embodiments.

A number of approaches may be taken towards implementing the logic of forwarding engines and virtual routers in different embodiments. FIG. 6 illustrates examples of alternative implementation choices for forwarding engines, according to at least some embodiments. In each of the three techniques illustrated in FIG. 6, one or more forwarding engines or FEs 640 may be configured at a virtualization host of a virtual computing service of the provider network at which the direct connectivity service is implemented in the depicted embodiment.

In a first example approach labeled FE-per-host 690A, a single virtual machine 630A may be instantiated a given virtualization host (VH) 610A. The virtualization host 610A may comprise a set of virtualization management components 620A and a host monitoring agent 622A. The virtualization management components 620A may perform encapsulation and de-encapsulation operations on outgoing and incoming data packets in some embodiments as discussed earlier in the context of FIG. 5. A single forwarding engine 640A, comprising for example one or more processes or threads of execution, may be established within virtual machine 630A in the depicted embodiment. The virtual machine 630 may also comprise a forwarding engine monitoring agent (FEMA) 642A in at least some embodiments. The FEMA 642A and/or the host monitoring agent 622A, each of which may comprise one or more processes or threads in some embodiments, may provide various types of metrics to administrative components of the provider network, e.g., to connectivity managers of the direct connectivity service. The metrics may be analyzed at the administrative components, e.g., to make decisions regarding reconfiguring the forwarding fleet if certain triggering conditions are met in at least some embodiments. Metrics collected and provided by the FEMA may include, for example, the number, sizes and arrival rates of inbound direct data connect packets, the number, sizes and arrival rates of outbound direct connect data packets, the number of distinct destinations to which the packets are forwarded, and so on in various embodiments. Metrics collected and provided by the HMA may include, for example, the CPU utilization of the VH, memory utilization, physical network interface utilization, storage utilization and the like.

In a second approach labeled FE-per-VM 690B, multiple VMs such as 630B and 630C may be instantiated at a given VH 610B. Within each VM, a respective FE (such as 640B or 640C) and a respective FEMA 642 (such as 642B or 642C) may be configured. The virtualization host 610B may include a single HMA 622B and a shared set of virtualization management components 620B in the depicted embodiment. Approach 690B may enable connectivity managers to respond to underutilization of virtualization host resources such as CPUs or memory (e.g., as detected using metrics provided by HMAs and/or FEMAs) by adding more FEs in various embodiments, and to respond to overutilization of virtualization host resources by migrating FEs to other virtualization hosts.

In a third approach labeled FE-per-SW-Container 690B, multiple software containers such as 670A and 670B may be set up within a given VM 630D at a virtualization host 610C. Generally speaking, software containers are a method of operating system virtualization that allow applications to be run in resource-isolated processes. Software containers may allow users to easily package an application's code, configurations, and dependencies into easy-to-use building blocks that deliver environmental consistency, operational efficiency, developer productivity, and version control in various embodiments. Within each software container in the depicted embodiment, a respective FE (such as 640D or 640E) and a respective FEMA 642 (such as 642D or 642E) may be configured. The virtualization host 610C may include a single HMA 622C and a shared set of virtualization management components 620C in the depicted embodiment. In some embodiments, software containers containing respective FEs may be set up directly on physical machines instead of using virtual machines. Approach 690C may provide an even finer level of control over scalability and isolation than provided by approach 690B, in that for example several virtual machines, each comprising one or more software containers, may potentially be set up on a single host in some embodiments.

Variants of the approaches indicated in FIG. 6 may be used for implementing the forwarding engine fleet in some embodiments—e.g., a combination of FEs implemented in software containers and FEs implemented directly within virtual machines may be used in one embodiment. By utilizing existing virtualization and/or container support provided by services already implemented in the provider network, the direct connectivity service may be able to leverage the scalability and cost advantages offered by the services in various embodiments. In some embodiments, neither virtualization nor software containers may be employed for at least some FEs of the FE fleet—instead, for example FEs may be set up on physical machines configured with non-virtualized operating systems.

Figure 7:
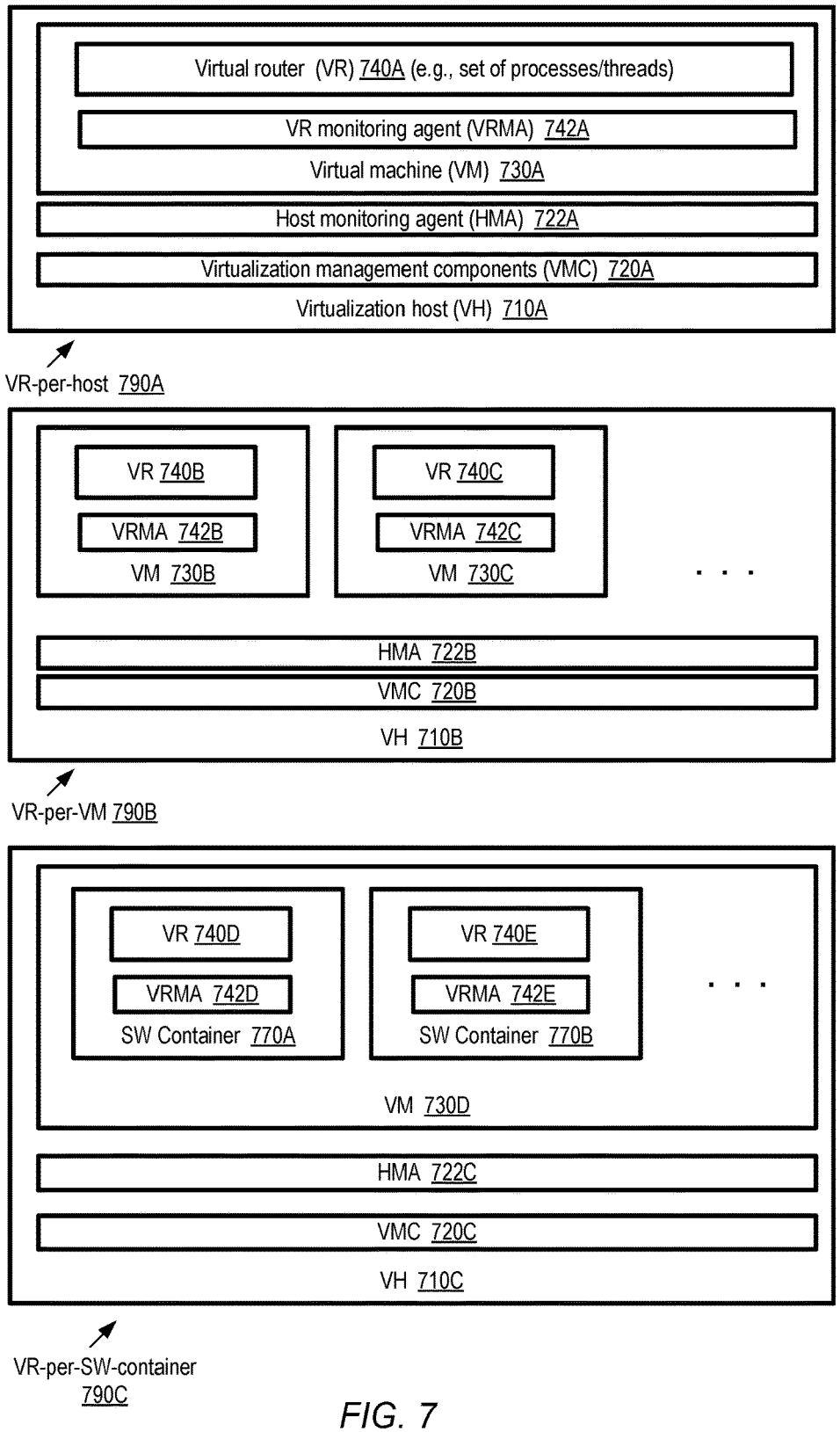
FIG. 7 illustrates examples of alternative implementation choices for virtual routers, according to at least some embodiments.

FIG. 7 illustrates examples of alternative implementation choices for virtual routers, according to at least some embodiments. In each of the three techniques illustrated in FIG. 7, one of more virtual routers or VRs 740 may be configured at a virtualization host of a virtual computing service of the provider network at which the direct connectivity service is implemented in the depicted embodiment.

In a first example approach labeled VR-per-host 790A, a single virtual machine 730A may be instantiated a given virtualization host (VH) 710A. As in FIG. 6, each of the virtualization hosts shown in FIG. 7 may comprise respective sets of virtualization management components 720 (e.g., 720A-720C) and a host monitoring agent 722 (e.g., 722A-722C). The virtualization management components 720A may perform encapsulation and de-encapsulation operations on outgoing and incoming packets containing routing information in some embodiments. A single virtual router (VR) 740A, comprising for example one or more processes or threads of execution, may be established within virtual machine 730A in the depicted embodiment. The virtual machine 730 may also comprise a virtual router monitoring agent (VRMA) 742A in at least some embodiments. The VRMA 742A and/or the host monitoring agent 722A, each of which may comprise one or more processes or threads in some embodiments, may provide various types of metrics to administrative components of the provider network, e.g., to connectivity managers of the direct connectivity service. The metrics may be analyzed at the administrative components, e.g., to make decisions regarding reconfiguring the virtual router fleet if certain triggering conditions are met in at least some embodiments. Metrics collected and provided by the VRMA may include, for example, the number, sizes and arrival rates of inbound packets comprising routing metadata, the number, sizes and arrival rates of outbound packets comprising routing metadata, the number, sizes and arrival rates of outbound packets comprising routing updates sent to the forwarding fleet, the number of distinct destinations within the forwarding engine fleet to which routing information updates are forwarded, and so on in various embodiments. As in FIG. 6, metrics collected and provided by the HMA may include, for example, the CPU utilization of the VH, memory utilization, physical network interface utilization, storage utilization and the like.

In a second approach labeled VR-per-VM 790B, multiple VMs such as 730B and 730C may be instantiated at a given VH 710B. Within each VM, a respective VR (such as 740B or 740C) and a respective VRMA 742 (such as 742B or 742C) may be configured. Approach 790B may enable connectivity managers to respond to underutilization of virtualization host resources such as CPUs or memory (e.g., as detected using metrics provided by HMAs and/or FEMAs) by adding more VRs in various embodiments, and to respond to overutilization of virtualization host resources by migrating VRs to other virtualization hosts.

In a third approach labeled VR-per-SW-Container 790B, multiple software containers such as 770A and 770B may be set up within a given VM 730D at a virtualization host 710C. Within each software container in the depicted embodiment, a respective VR (such as 740D or 740E) and a respective VRMA 742 (such as 742D or 742E) may be configured. In some embodiments, software containers containing respective VRs may be set up directly on physical machines instead of using virtual machines. Approach 790C may provide an even finer level of control over scalability and isolation than provided by approach 790B with respect to virtual routers, in that for example several virtual machines, each comprising one or more software containers, may potentially be set up on a single host in some embodiments.

Variants of the approaches indicated in FIG. 7 may be used for implementing the virtual router fleet in some embodiments—e.g., a combination of VRs implemented in software containers and VRs implemented directly within virtual machines may be used in one embodiment. As discussed in the context of FIG. 6 with respect to forwarding engines, by utilizing existing virtualization and/or container support provided by computing services already implemented in the provider network, the direct connectivity service may be able to leverage the scalability and cost advantages offered by the services in various embodiments for provisioning and managing the virtual router fleet. In some embodiments, neither virtualization nor software containers may be employed for at least some VRs of the VR fleet—instead, for example VRs may be set up on physical machines configured with non-virtualized operating systems.

Administrative Components of Direct Connectivity Service

Figure 8:
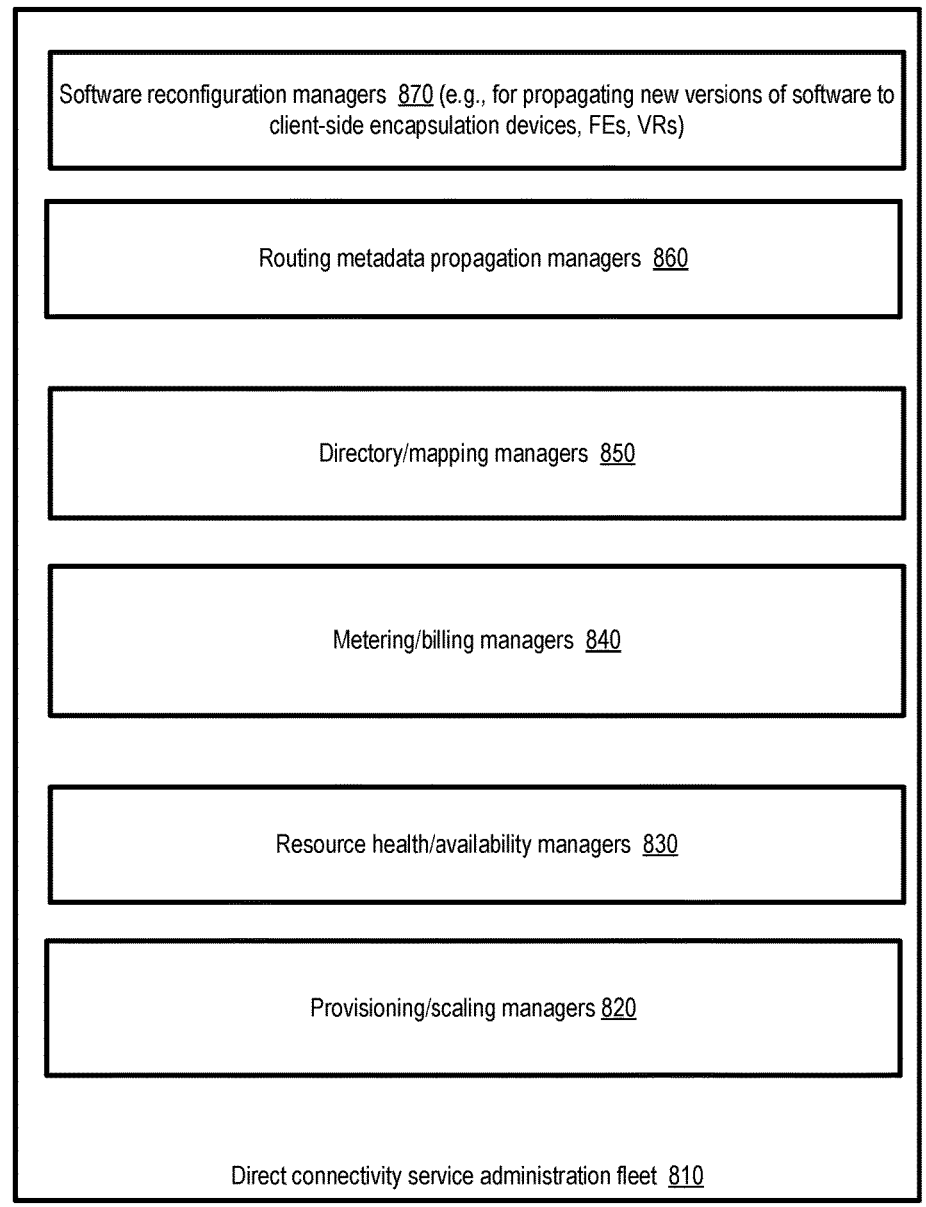
FIG. 8 illustrates example administrative subcomponents of a direct connectivity service of a provider network, according to at least some embodiments.

FIG. 8 illustrates example administrative subcomponents of a direct connectivity service of a provider network, according to at least some embodiments. As shown, direct connectivity service administration fleet may comprise, among other elements, one or more provisioning or scaling managers 820, one or more resource health and availability managers 830, one or more metering/billing managers 840, one or more directory/mapping managers 850, one or more routing metadata propagation managers 860, and one or more software reconfiguration managers 870 in the depicted embodiment. Some or all of the various administrative subcomponents shown in FIG. 5 may be referred to collectively in some embodiments as connectivity managers. Individual ones of the subcomponents shown may be implemented using one or more hardware devices and associated software in various embodiments A provisioning/scaling manager 820 may be responsible for making and implementing decisions regarding changing the populations or configurations of the forwarding engine fleet and/or the virtual router fleet of the direct connectivity service in various embodiments. Such decisions may be based on detecting that triggering conditions have been met for adding or reducing the number of forwarding engines assigned to a given customer, for adding or reducing the number of virtual routers designated for a given customer, for expanding or contracting the forwarding engine fleet as a whole, or for expanding or contracting the virtual router fleet as a whole. As mentioned earlier, decisions to modify the number of forwarding engines may be made independently of the decisions to modify the number of virtual routers in at least some embodiments. The triggering conditions may be checked in at least some embodiments by analyzing metrics gathered by the resource health and availability managers 830 and/or metrics collected directly by the provisioning/scaling manager from various monitoring agents, such as the forwarding engine monitoring agents, virtual router monitoring agents, and host monitoring agents discussed above.

Resource health and availability managers 830 may collect information about the health and interconnectivity status of various components of the direct connectivity service—e.g., whether the hosts, virtual machines or software containers for the forwarding engines and the virtual routers remain functional and responsive, whether the programmable encapsulation devices set up at the co-location facilities remain functional and responsive, and so on. If a failure (or an apparent failure) of a forwarding engine or virtual router is detected, in at least some embodiments the resource health and availability manager may initiate a failover of the failed component's workload to one or more other components of the same type, e.g., within the same cluster as the failed component if possible. In some cases, a resource health and availability manager 830 may be responsible for initiating and verifying recovery of a failed component, e.g., by rebooting, and may initiate provisioning of a permanent replacement for a component which fails to recover cleanly.

Metering and billing managers 840 may be responsible for tracking the usage of the direct connect functionality by various customers, and for initiating the preparation of corresponding bills in the depicted embodiment. Directory/mapping managers 850 may be responsible for maintaining up-to-date information regarding the relationships between different components of the direct connectivity service in some embodiments—e.g., information indicating the forwarding engine clusters which are associated with a given router cluster, the mappings between customer isolated virtual networks and forwarding engine clusters, and so on. Routing metadata propagation managers 860 may be responsible in one embodiment for enforcing various policies governing the transmission of routing metadata by the virtual routing fleet to the forwarding engine fleet, e.g., for deciding when and how the routing entries and/or forwarding entries should be sent to various forwarding engines, how the routing metadata caches are managed, and so on. An atomic mutation policy for mutating routing or forwarding information base entries may be enforced by the routing metadata propagation managers in some embodiments, e.g., in an attempt to ensure that routing changes do not affect data packet forwarding. In at least some embodiments, software reconfiguration managers 870 may be responsible for rolling out new versions of software to the different non-administrative components of the direct connectivity service, including for example the forwarding engines, the virtual routers and/or the programmable encapsulation devices. It is noted that in some embodiments, not all the administrative subcomponents shown in FIG. 8 may be required, while in other embodiments subcomponents not shown in FIG. 8 may be used.

Forwarding Engine Failure Handling Example

In at least some embodiments, as mentioned earlier, the resources of the direct connectivity service may be distributed among availability containers. Many types of failures, such as individual forwarding engine failures in an embodiment in which clusters of forwarding engines are set up for respective customers, may be dealt with by failing over to other resources within the same availability container. In the extremely unlikely event that all the forwarding engines of a given cluster or a given availability container fail, in various embodiments, the programmable encapsulation devices may be notified (e.g., via updated routing metadata) regarding the failure. As a result, inbound direct connect traffic can be routed via some other availability container's forwarding engines. The impact of such a failure on outbound traffic may be slightly different in at least some embodiments.

Figure 9:
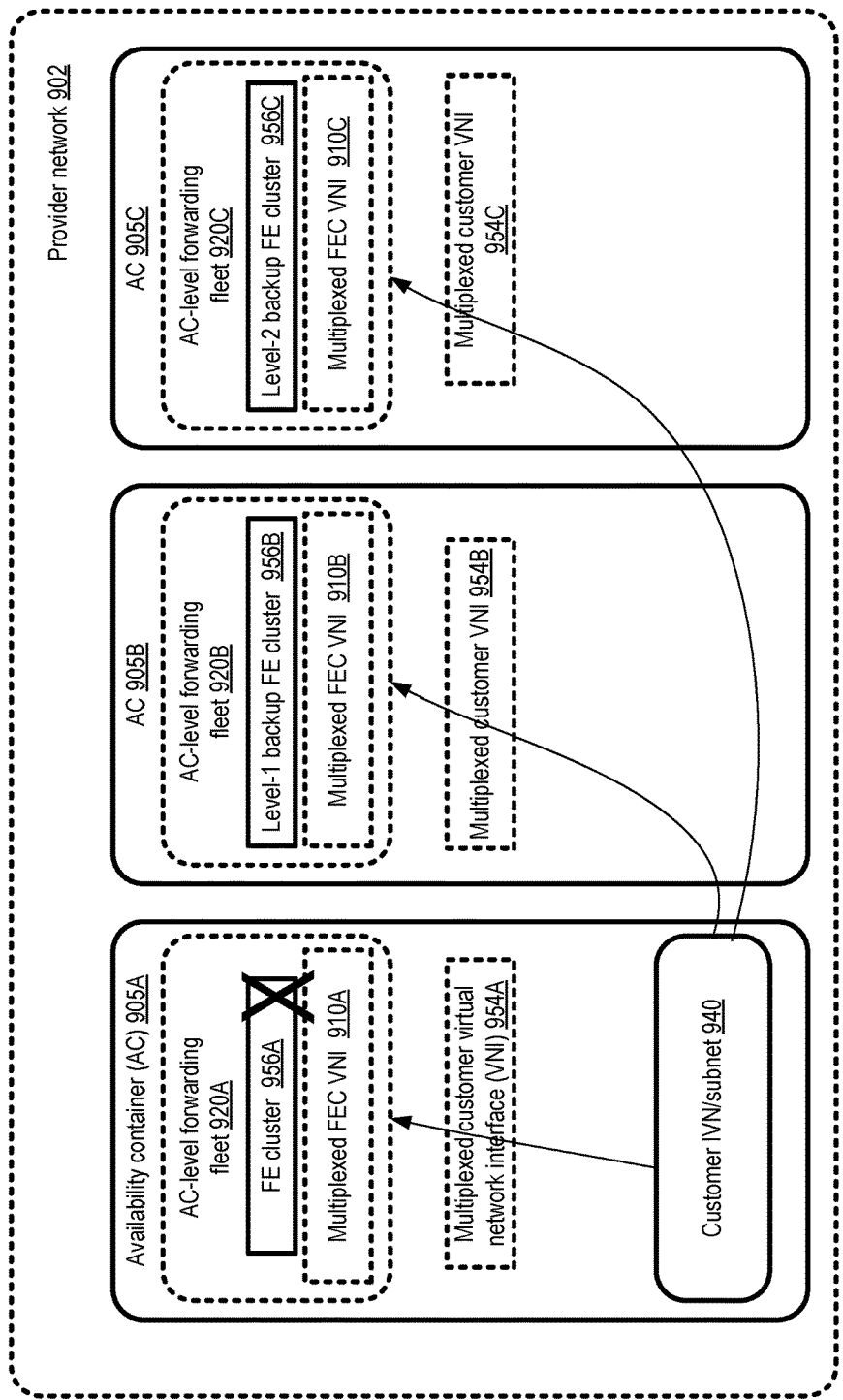
FIG. 9 illustrates an example configuration in which backup forwarding engines for outbound traffic may be utilized across availability container boundaries, according to at least some embodiments.

FIG. 9 illustrates an example configuration in which backup forwarding engines for outbound traffic may be utilized across availability container boundaries, according to at least some embodiments. The provider network comprises at least three availability containers 905A, 905B and 905C in the depicted embodiment. Forwarding engine cluster 956A within the availability-container level forwarding fleet 920A at the same availability container 905A as a subnet of the customer's isolated virtual network 940 may be used as the primary forwarding engine cluster for the subnet's outbound direct connect traffic. As indicated earlier, in some embodiments a multiplexed virtual network interface (VNI) 954A may be set up within availability container 905A for direct connect traffic associated with the customer's resources, and a multiplexed VNI 910A may be set up for the FEC 956A. If FEC 956A fails, outbound traffic may be forwarded by a backup FEC set up on behalf of the customer in another availability container in the depicted embodiment, such as level-1 backup FEC 956B set up in AC-level fleet 920B at availability container 905B and level-2 backup FEC 956C set up in AC-level fleet 920C availability container 905C. The terms "level-1" and "level-2" may be used to indicate that FEC 956B is the first choice as a replacement FEC if/when FEC 956A fails, and that FEC 956C would be used if both FEC 956A and FEC 856B happen to fail in the depicted embodiment. Respective multiplexed VNIs may be set up for each of the backup FECs (e.g., VNIs 910B and 910C for FECs 956B and 956C respectively) and for the customer's resources (e.g., VNIs 954B and 954C) in each of the other availability containers in at least some embodiments.

Routing Session Failure Handling Example

Figure 10:
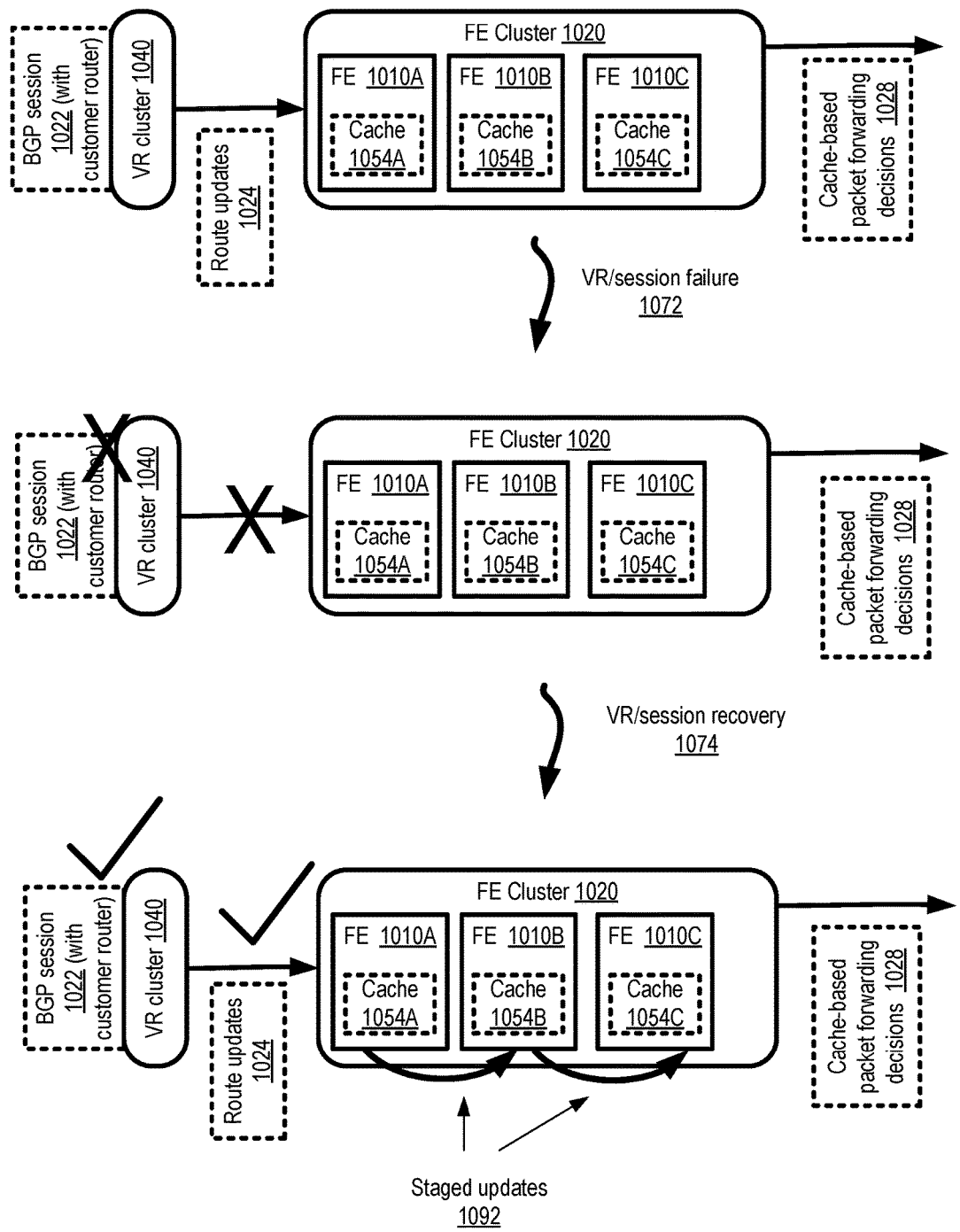
FIG. 10 illustrates an example scenario in which forwarding engines may continue to forward packets for at least some time periods despite failures associated with the exchange of routing information, according to at least some embodiments.

FIG. 10 illustrates an example scenario in which forwarding engines may continue to forward packets for at least some time periods despite failures associated with the exchange of routing information, according to at least some embodiments. In the depicted embodiment, a forwarding engine cluster 1020 and an associated virtual router cluster 1040 may be designated for the direct connect traffic of one or more customers. The VR cluster 1040 may establish a session 1022 of a routing information exchange protocol (such as BGP) with a customer router outside the provider network, obtain routing metadata from the customer router, and propagate the routing metadata to the FE cluster 1020. At the FE cluster, each of the forwarding engines may maintain a respective cache of the routing metadata, such as caches 1054A-1054C at forwarding engines 1010A—1010C respectively. The local caches 1054 may be used to forward packets received at the forwarding engines in the depicted embodiment, as indicated by the element labeled cache-based forwarding decisions 1028. Under normal operating conditions, the caches may typically contain identical routing/forwarding information base entries, being updated as new routing updates are received from the VR cluster 1040.

It may be the case that at some point in time in the depicted embodiment, the session 1022 fails, the VR cluster 1040 fails, and/or the connectivity between the VR cluster 1040 and the FE cluster 1020 is disrupted, as indicated by the "X" symbols and the arrow 1072 in FIG. 10. In such a scenario, in at least some embodiments, the forwarding engines 1010 may implement a "non-stop" forwarding policy, according to which they continue to forward data packets using the routing metadata available in their local caches. That is, a failure at the VR fleet may not necessarily disrupt operations at the forwarding fleet in such embodiments. Of course, if routes to some networking devices or endpoints no longer work while the routing data interchange session is offline, some packets may potentially be lost in the depicted embodiment; however, as routing changes typically may occur at much slower rates that data packet transfers, the vast majority of packets may continue to be delivered without error.

When recovery is completed following the failure event, as indicated by arrow 1074 and the check-mark symbols in FIG. 10, it may be the case that updated routing information is obtained at the VR cluster 1040. In the depicted embodiment, such routing updates 1024 may be applied in a staged fashion rather than globally within the FE cluster. That is, instead of updating all the caches 1024 at all the forwarding engines in a single operation, which may potentially result in no forwarding engine being available for processing a newly-received data packet, one cache may be updated at a time in a staged updates procedure 1092. As a result, during the (typically short) time interval in which a given cache is being updated, the other caches may continue to be used for forwarding packets in the depicted embodiment, thereby avoiding disruption in customer data flows.

Methods for Supporting Direct Connectivity

Figure 11:
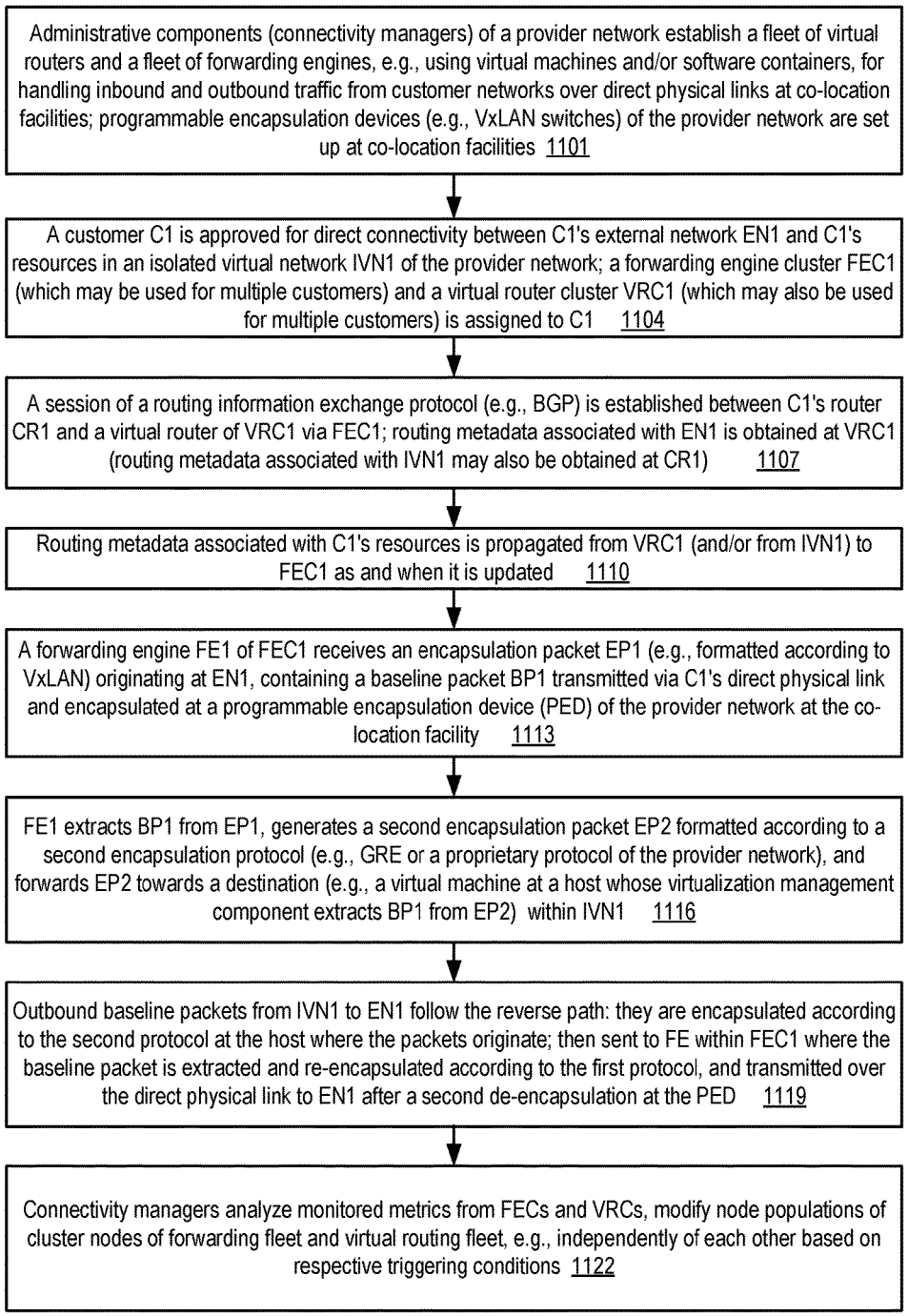
FIG. 11 is a flow diagram illustrating aspects of operations that may be performed to support direct network connectivity using fleets of independently scalable forwarding engines and virtual routers, according to at least some embodiments.

FIG. 11 is a flow diagram illustrating aspects of operations that may be performed to support direct network connectivity using fleets of independently scalable forwarding engines and virtual routers, according to at least some embodiments. As shown in element 1101, administrative components of a direct connectivity service of a provider network (such as a connectivity manager) may establish a fleet of virtual routers and a fleet of forwarding engines, e.g., using virtual machines and/or software containers, for handling inbound and outbound traffic from customer networks over direct physical links in various embodiments. At co-location facilities, programmable encapsulation devices (e.g., VxLAN switches) of the provider network may be set up and connected via the direct physical links to customer edge routers in some embodiments.

Potential customers may request that their customer network be linked to the provider network via a direct connect link at a selected co-location facility convenient to the customers. A particular customer C1 may be approved for direct connectivity between C1's external network EN1 and C1's resources (such as one or more virtual machines) in an isolated virtual network IVN1 of the provider network (element 1104) in the depicted embodiment. A forwarding engine cluster FEC1 (which may be set up in multi-tenant mode, and therefore potentially used for multiple customers) and a virtual router cluster VRC1 (which may also potentially be used for multiple customers) may be assigned to C1 for C1's direct connect traffic in some embodiments.

In order for packets to be routed correctly when flowing between EN1 and IVN1, routing information may have to be exchanged between the provider network and EN1 in the depicted embodiment. A session of a routing information exchange protocol (e.g., BGP or EBGP) may be established between router CR1 of customer C1 and a virtual router of VRC1 (element 1107) in some embodiments. Packets containing routing metadata may pass through the forwarding engine cluster FEC1 in at least one embodiment. Via the session, routing metadata associated with EN1 may be obtained at VRC1. Routing metadata associated with IVN1 may also be obtained at the customer router CR1 in various embodiments during the session.

Routing metadata associated with C1's resources may be propagated from VRC1 to FEC1 as and when it is updated (element 1110) in the depicted embodiment. In at least one embodiment, FEC1 may also receive routing metadata from other sources, e.g., from control-plane or administrative components of the customer's isolated virtual network IVN1 or the virtual computing service at which IVN1 is implemented.

As part of the inbound flow of data from EN1 towards a destination virtual machine within IVN1, a forwarding engine FE1 of FEC1 may receive an encapsulation packet EP1 (e.g., formatted according to VxLAN) originating at EN1 (element 1113) in the depicted embodiment. EP1 may contain a baseline packet BP1 transmitted via C1's direct physical link and encapsulated at a programmable encapsulation device (PED) of the provider network at the co-location facility.

FE1 may extract the baseline packet BP1 from EP1 and generate a second encapsulation packet EP2 formatted according to a second encapsulation protocol (e.g., GRE or a proprietary protocol of the provider network) (element 1116) in the depicted embodiment. This second encapsulation packet EP2 may be transmitted towards BP1's destination within IVN1 (e.g., a virtual machine at a host whose virtualization management component eventually extracts BP1 from EP2 and provides it to the virtual machine).

Outbound baseline packets from IVN1 to EN1 may follow the reverse path in the depicted embodiment (element 1119). For example, they may be encapsulated according to the second protocol at the host where the outbound baseline packets originate, then sent to an FE within FEC1 where the baseline packet is extracted and re-encapsulated according to the first protocol, and then transmitted over the direct physical link to EN1 after a second de-encapsulation at the programmable encapsulation device.

Connectivity managers may analyze monitored metrics from FECs and VRCs in various embodiments and may modify node populations of clusters of the forwarding fleet and virtual routing fleet, e.g., independently of each other based on respective triggering conditions (element 1122). In order to increase the number of forwarding engines or virtual routers, in some embodiments the connectivity managers may instantiate new virtual machines or new software containers; in other embodiments, pre-existing virtual machines and/or pre-existing software containers may be re-used. For example, one or more pools of virtual machines and/or software containers may be maintained for the virtual routers and/or the forwarding engines, and the connectivity managers may identify specific pool members to be assigned as additional virtual routers or forwarding engines to a given customer.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

The techniques described above, of configuring independently scalable fleets of forwarding engines and virtual routers to support connectivity via direct dedicated physical links between provider networks and customer networks may be useful in a variety of environments. Customers are migrating more and more mission critical applications to provider network environments. In many cases, an application being run at a provider network may need to communicate with devices at the customer's external networks securely and at high levels of performance. Organizing dynamically modifiable fleets of forwarding engines to handle high volume traffic between external networks and resources within the provider network may enable support for very high bandwidths for various customers. Utilizing a separate dynamically modifiable virtual routing fleet to obtain and propagate routing information about customer networks may enable support for large numbers of customers. Setting up virtual routers and/or forwarding engines at software containers or virtual machines may enable efficient, low-cost scale-up and scale-down of direct connect resources, taking advantage of the existing capabilities of computing services of the provider network.

Illustrative Computer System

Figure 12:
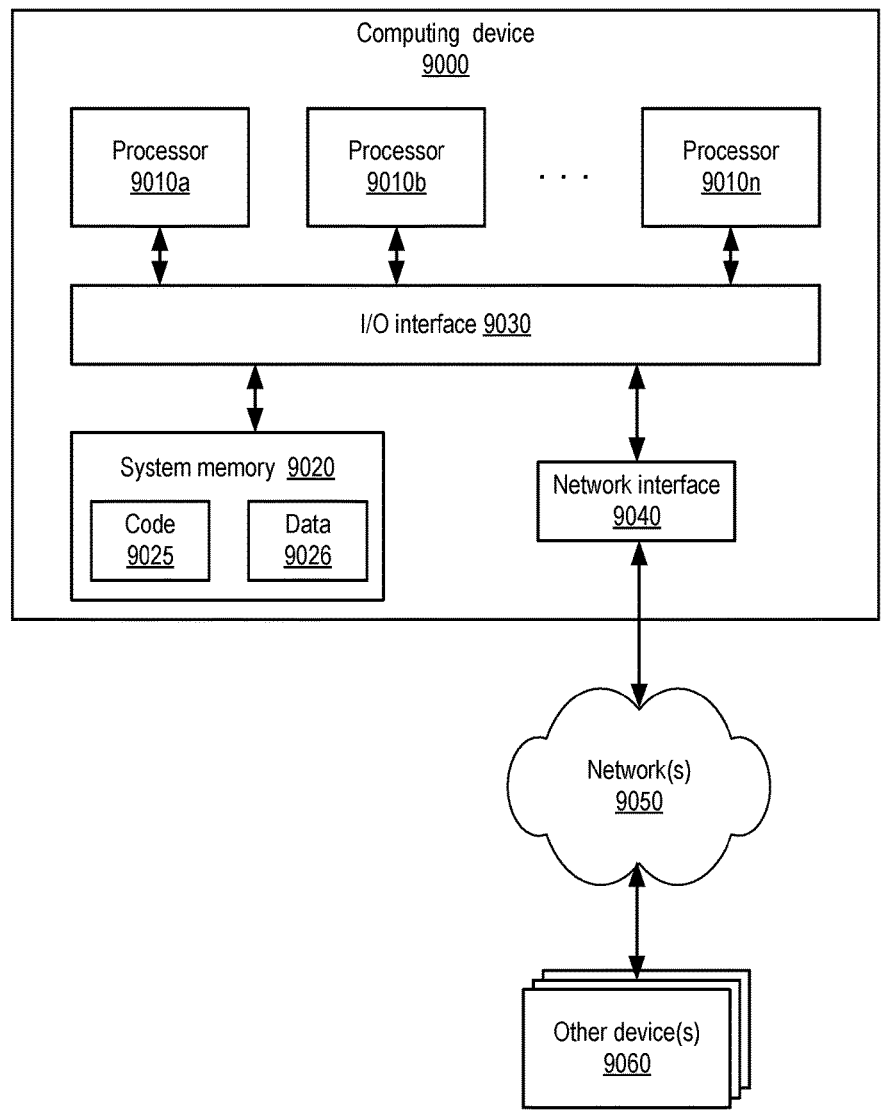
FIG. 12 is a block diagram illustrating an example computing device that may be used in at least some embodiments.

In at least some embodiments, a server that implements one or more of the techniques described above for managing and using direct connect links, including for example connectivity managers and other administrative components of a direct connectivity service, forwarding engines, virtual routers, edge routers and/or programmable encapsulation devices may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of virtual routers implemented at one or more computing devices of a virtual routing fleet of a direct connectivity service of a provider network;
    a plurality of forwarding engines implemented at one or more computing devices of a packet forwarding fleet of the direct connectivity service; and
    a connectivity manager implemented at one or more computing devices of the direct connectivity service;
    wherein a first virtual router of the virtual routing fleet includes instructions that when executed on a first computing device cause the first computing device to obtain, via a first session of a routing information exchange protocol with a first user-owned router of a first user of the direct connectivity service, one or more routing metadata entries;
    wherein a first forwarding engine of the packet forwarding fleet includes instructions that when executed on a second computing device cause the second computing device to:
        receive a first encapsulation packet from an edge router of the provider network, wherein the first encapsulation packet comprises a first baseline packet originating at a computing device of the first user and transmitted over a direct physical link to a first encapsulating device configured on behalf of the direct connectivity service, wherein the first encapsulating device is located at premises external to the provider network; and
        forward, based on a set of routing metadata which includes the one or more routing metadata entries, the first baseline packet to a destination virtual machine of the first user within the provider network; and
    wherein the connectivity manager includes instructions that when executed on a third computing device cause the third computing device to:
        based on a first triggering condition, modify the number of forwarding engines established in the forwarding fleet; and
        based on a second triggering condition, modify the number of virtual routers established in the virtual routing fleet.

2. The system as recited in claim 1, wherein the first encapsulation packet is formatted in accordance with a first encapsulation protocol, wherein, to forward the first baseline packet, the first forwarding engine includes instructions that when executed on the second computing device cause the second computing device to:
    transmit the first baseline packet within a second encapsulation packet generated in accordance with a second encapsulation protocol.

3. The system as recited in claim 2, wherein the first encapsulation protocol is based on a version of a virtual extensible local area network (VxLAN) protocol, and wherein the second encapsulation protocol is based on a version of a generic routing encapsulation (GRE) protocol or a proprietary encapsulation protocol of the provider network.

4. The system as recited in claim 1, wherein the first virtual router comprises one or more threads of execution within a first software container established at a computing service of the provider network, wherein to modify the number of virtual routers, the connectivity manager includes instructions that when executed on the third computing device cause the third computing device to:
    configure one or more threads of execution of a second virtual router within a second software container.

5. The system as recited in claim 1, wherein the first forwarding engine comprises one or more threads of execution within a first virtual machine established at a computing service of the provider network, wherein to modify the number of forwarding engines, the connectivity manager includes instructions that when executed on the third computing device cause the third computing device to:
    configure one or more threads of execution of a second forwarding engine at a second virtual machine.

6. A method, comprising:
    transmitting, from a first virtual router of a virtual routing fleet of a direct connectivity service of a provider network, to a first forwarding engine of a forwarding fleet of the direct connectivity service, one or more routing metadata entries obtained at the first virtual router in a first session of a routing information exchange protocol with a first client-side networking device of a first user of the service;
    receiving, at the first forwarding engine, a first encapsulation packet, wherein the first encapsulation packet comprises a first baseline packet originating at a computing device of the first user and transmitted over a first direct physical link to a first encapsulating device configured on behalf of the direct connectivity service, wherein the first encapsulating device is located at premises external to the provider network; and
    forwarding, from the first forwarding engine, based on a set of routing metadata which comprises the one or more routing metadata entries, the first baseline packet to a destination resource of the first user within the provider network.

7. The method as recited in claim 6, further comprising:
    modifying, by a connectivity manager of the direct connectivity service, based on a first triggering condition, the number of virtual routers established in the virtual routing fleet, without modifying the number of forwarding engines established in the forwarding fleet; and
    modifying, by the connectivity manager, based on a second triggering condition, the number of forwarding engines established in the virtual routing fleet, without modifying the number of virtual routers established in the forwarding fleet.

8. The method as recited in claim 7, wherein the first virtual router comprises one or more threads of execution within a first software container established at a computing service of the provider network, wherein said modifying the number of virtual routers comprises:

instantiating a second software container at the container service; and launching one or more threads of execution of a second virtual router within the second software container.

9. The method as recited in claim 7, wherein the first forwarding engine comprises one or more threads of execution within a first virtual machine established at a virtualized computing service of the provider network, wherein said modifying the number of forwarding engines comprises:

instantiating a second virtual machine at the virtualized computing service; and launching one or more threads of execution of a second forwarding engine at the second virtual machine.

10. The method as recited in claim 6, wherein the first encapsulation packet is formatted in accordance with a first encapsulation protocol, wherein said forwarding comprises:

generating, at the first forwarding engine, a second encapsulation packet in accordance with a second encapsulation protocol, wherein the second encapsulation packet comprises the first baseline packet; and transmitting the second encapsulation packet on a selected network link.

11. The method as recited in claim 10, wherein the first encapsulation protocol is based on a version of a virtual extensible local area network (VxLAN) protocol, and wherein the second encapsulation protocol comprises a version of a generic routing encapsulation (GRE) protocol.

12. The method as recited in claim 6, further comprising:

receiving, at a second forwarding engine of the forwarding fleet, a particular message of the first session of the routing information exchange protocol, wherein the particular message originated at the first client-side networking device; and forwarding, to the first virtual router from the second forwarding engine, the particular message.

13. The method as recited in claim 6, wherein the destination resource comprises a virtual machine established at a virtualization host configured within an isolated virtual network, the method further comprising:

obtaining, at a virtualization management component of the virtualization host, an outbound baseline packet directed to the computing device of the first user, wherein the outbound baseline packet is generated at the virtual machine;

generating, at the virtualization management component, a second encapsulation packet comprising the outbound baseline packet;

transmitting, from the virtualization management component, the second encapsulation packet to a selected forwarding engine of the forwarding fleet; and extracting, at the selected forwarding engine, the outbound baseline packet from the second encapsulation packet;

generating, at the selected forwarding engine, a third encapsulation packet comprising the outbound baseline packet; and forwarding, from the selected forwarding engine on a path to the computing device, the third encapsulation packet, wherein the path includes the first direct physical link.

14. The method as recited in claim 6, further comprising:

receiving, at the first forwarding engine, a second encapsulation packet, wherein the second encapsulation packet comprises a second baseline packet originating at a computing device of a second user of the direct connectivity service and transmitted over a second direct physical link to a second encapsulating device configured on behalf of the direct connectivity service, wherein the second encapsulating device is located at different premises external to the provider network; and forwarding, from the first forwarding engine, based on a portion of a second set of routing metadata, the second baseline packet to a destination resource of the second user within the provider network.

15. The method as recited in claim 6, further comprising:

establishing, by the first virtual router, a second session of the routing information exchange protocol with a second client-side networking device of a second user of the service;

obtaining, at the first virtual router via the second session, a second set of routing metadata pertaining to resources of the second user; and transmitting, to one or more forwarding engines of the forwarding fleet by the first virtual router, the second set of routing metadata.

16. A non-transitory computer-accessible storage medium storing program instructions that when executed on one or more processors cause the one or more processors to:

establish one or more forwarding engines of a forwarding fleet of a direct connectivity service of a provider network, including a first forwarding engine, wherein the first forwarding engine is responsible at least for forwarding packets received from outside the provider network via a direct physical link from a user network of a first user to one or more resources of the first user within the provider network;

establish one or more virtual routers of a virtual router fleet of the direct connectivity service, including a first virtual network responsible for obtaining routing metadata from a client-side networking device of the first user via a session of a routing information exchange protocol and transmitting at least a portion of the routing metadata to at least the first forwarding engine;

in response to a first triggering condition, modify the number of forwarding engines established in the forwarding fleet; and in response to a second triggering condition, modify the number of virtual routers established in the virtual router fleet.

17. The non-transitory computer-accessible storage medium as recited in claim 16, wherein to establish the first forwarding engine or the first virtual router, the instructions when executed on the one or more processors cause the one or more processors to:

identify a first virtual machine implemented at a computing service of a provider network; and cause one or more threads of execution to be instantiated at the first virtual machine.

18. The non-transitory computer-accessible storage medium as recited in claim 16, wherein to establish the first forwarding engine or the first virtual router, the instructions when executed on the one or more processors cause the one or more processors to:

identify a first software container implemented at a computing service of a provider network; and cause one or more threads of execution to be instantiated in the first software container.

19. The non-transitory computer-accessible storage medium as recited in claim 16, wherein the instructions when executed on the one or more processors cause the one or more processors to:

in response to determining that connectivity via the direct physical link to the provider network is to be enabled for the user network, identify a cluster comprising a plurality of forwarding engines; and assign at least a portion of the cluster to the first user.

20. The non-transitory computer-accessible storage medium as recited in claim 16, wherein the instructions when executed on the one or more processors cause the one or more processors to:

in response to determining that connectivity via the direct physical link to the provider network is to be enabled for the user network, identify a cluster comprising a plurality of virtual routers; and assign at least a portion of the cluster to the first user.

* * * * *